United States Patent [19]
Chung et al.

[11] Patent Number: 5,866,659
[45] Date of Patent: Feb. 2, 1999

[54] FUNCTIONALIZED α-OLEFIN/PARA-ALKYLSTYRENE COPOLYMERS

[75] Inventors: T. C. Chung; H. L. Lu, both of State College, Pa.

[73] Assignee: The Penn State Research Foundation, University Park, Pa.

[21] Appl. No.: 671,990

[22] Filed: Jun. 28, 1996

Related U.S. Application Data

[63] Continuation-in-part of Ser. No. 341,778, Nov. 18, 1994, Pat. No. 5,543,484.

[51] Int. Cl.$^6$ .................................................. C08F 257/02
[52] U.S. Cl. ......................... 525/279; 525/267; 525/268; 525/309; 525/311; 525/313; 525/333.3; 525/333.4; 525/333.5; 525/333.6; 525/343; 525/359.2; 525/366; 525/374; 525/375; 525/379; 525/383; 525/386; 526/347
[58] Field of Search ..................... 525/247, 268, 525/256, 258, 259, 333.3, 333.4, 333.5, 333.6, 267, 309, 311, 313, 279, 343, 359.2, 366, 374, 375, 379, 383, 386

[56] References Cited

U.S. PATENT DOCUMENTS

| | | |
|---|---|---|
| 4,145,490 | 3/1979 | Harris et al. . |
| 4,530,914 | 7/1985 | Ewen et al. . |
| 4,542,199 | 9/1985 | Kaminsky et al. . |
| 4,665,047 | 5/1987 | Slaugh et al. . |
| 4,734,472 | 3/1988 | Chung . |
| 4,751,276 | 6/1988 | Chung . |
| 4,752,597 | 6/1988 | Turner . |
| 4,812,529 | 3/1989 | Chung . |
| 4,877,846 | 10/1989 | Chung . |
| 5,026,798 | 6/1991 | Canich et al. . |
| 5,162,445 | 11/1992 | Powers et al. ........................ 525/333.4 |
| 5,272,236 | 12/1993 | Lai et al. . |
| 5,286,800 | 2/1994 | Chung et al. . |
| 5,432,222 | 7/1995 | Baron ................................... 526/83 X |

OTHER PUBLICATIONS

Aaltonen et al, Macromolecules 27, 3136, 1994.
Soga et al, Macromolecules, 22, 2875, 1989.
Doe et al, Coordination Polymerization, "Living" Coordination Plymerization of Propylene and its Application to Block Copolymer Synthesis, pp. 249–265 1983.
Harris et al, Macromolecules, 19, 2903–2908, 1986.
Onopchenkov et al, J. Org. Chem., 37, 1414–1417, 1972.
Ferrari et al Macromolecules, 24, 6340–6342, 1991.
Mohanraj et al, Macromolecules, 19, 2470–2472, 1986.
Pini et al, Macromolecules, 20, 58–62, 1987.
Jones et al, Polymer, 31, 1519–1525, 1990.
Nagasaki et al, Makromol. Chem., Rapid Commun. 7, 437–443, 1986.
Bonaccorsi et al Polymer International, vol. 30, 93–100, 1993.
Camps, Macromol. Chem. Physics, C22(3), 343–407, 1982–83.
Montheard et al, Rev. Macromol. Chem. Phys., C–28, 503–593, 1988.
Chemical Modification of Polymers Via Phase Transfer Catalyst, Frechet, in "Crown Ethers and Phase Transfer Catalyst in Polymer Science", 1984.
Chinsirikul et al, J. Thermoplastic Composite Materials, 6, 18–28, 1993.
Lee et al, Polymer, 35, 2980–2984, 1994.
Chung et al, Macromolecules, 26, 3467–3471, 1993.
Chung et al. Macromolecules, 27, 1313–1319, 1994.

*Primary Examiner*—Fred Teskin
*Attorney, Agent, or Firm*—Thomas J. Monahan

[57] ABSTRACT

Functionalized copolymers of α-olefin and para-alkylstyrene having the formula:

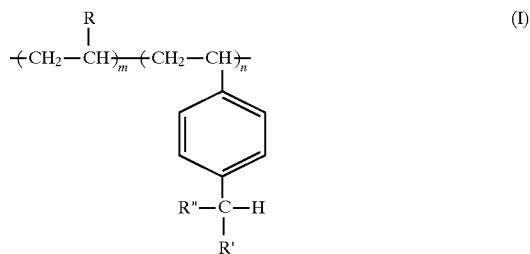

in which in which R, R' and R", independently, are hydrogen or primary or secondary alkyl groups; X comprises a functional group, such as —COOH, —OH, —SH, —NH$_2$, —Cl, —Br, —M, —COOM (M=metals, e.g. Li, Na, K and Ca) and anhydrides; P comprises a polymer having the molecular weight of at least about 500, which can be derived from both step and chain polymerization reactions; Y is a chemical linkage between polymer P and para-alkystyrene side chain, which is also a residue derived from graft reaction; and the combination of a+b+c+d represents the empirical formula of a substantially random functional polymer, where a ranges from about 50 to about 100,000, b, c and d range from 0 to about 10,000, and the sum of c+d is at least 1, and processes for preparing the funcitonalized copolymers are disclosed.

25 Claims, 4 Drawing Sheets

FUNCTIONALIZED α-OLEFIN/PARA-ALKYLSTYRENE COPOLYMERS

RELATED APPLICATION

This application is a continuation-in-part of Ser. No. 08/341,778, filed Nov. 18, 1994, now U.S. Pat. No. 5,543,484.

FIELD OF THE INVENTION

The present invention relates to functionalized copolymers of α-olefin and para-alkylstyrene. The formula of functionalized copolymer is shown below:

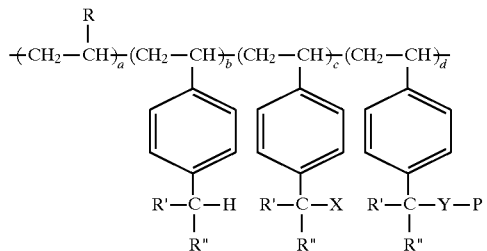

in which R, R' and R", independently, are hydrogen or primary or secondary alkyl groups; X comprises a functional group, such as —COOH, —OH, —SH, —NH$_2$, —Cl, —Br, —M, —COOM (M=metals, e.g. Li, Na, K and Ca) and anhydrides; P comprises a polymer having the molecular weight of at least about 500, which can be derived from both step and chain polymerization reactions; Y is a chemical linkage between polymer P and para-alkystyrene side chain, which is also a residue derived from graft reaction, and the combination of a+b+c+d represents the empirical formula of a substantially random functional polymer, where a ranges from about 50 to about 100,000, b, c and d range from 0 to about 10,000, and the sum of c+d is at least 1.

Preferably, R is hydrogen or C$_1$ to C$_{10}$ linear and branched alkyl, and most preferably R is hydrogen or C$_1$ to C$_3$ linear or branched alkyl. R' and R" preferably are hydrogen or C$_1$ to C$_5$ primary or secondary alkyl, and most preferably R' and R" are hydrogen. In the above formula, the residue includes a simple chemical bond or a functional group, such as an ether, ester, amide and imide.

The present invention also relates to functionalization processes, including both graft-onto and graft-from reactions, for producing functionalized copolymers of α-olefin and p-alkylstyrene with functional groups located along the polyolefin backbone or concentrated in the side chain segments.

BACKGROUND OF THE INVENTION

The copolymerization of styrene and α-olefins is usually very difficult in the direct copolymerization processes using Ziegler-Natta catalysts (see Aaltonen, et al., Macromolecules 27, 3136, 1994 and Soga et al., Macromolecules, 22, 2875, 1989). Especially involving stereospecific heterogeneous catalysts, the reactivity of monomer is sterically controlled, the larger the size the lower the reactivity. Only very few % of styrene has been randomly incorporated in polyethylene (HDPE) and isotactic polypropylene (i-PP) in the batch reactions. By using several low reactivity metal oxide catalysts and tinder very inconvenient "living" polymerization conditions, the combination of Ziegler-Natta polymerization and transformation reactions has been reported to produce some α-olefin/styrene diblock copolymers (see Doe et al., "Coordination Polymerization", "Living" Coordination Polymerization of Propylene and its Application to Block Copolymer Synthesis, pages 249–265, edited by Price and Vandenberg, Plenum Press, 1983).

On the other hand, the copolymerization of styrene (styrene derivatives) and isobutylene with cationic catalysts is known in the art (see Harris et al., U.S. Pat. No. 4,145,190 and Macromolecules, 19, 2903, 1986). Under cationic polymerization conditions, p-alkylstyrene and isobutylene have been copolymerized rather readily to yield copolymers covering a wide compositional range. Thus, such copolymers ranging from tough, glassy high poly(p-alkylstyrene) content copolymers for use in plastic blends, to rubbery p-alkylstyrene incorporated isobutylene copolymers have been prepared. Furthermore, the copolymers have been used in a variety of applications, including use as adhesives in connection with other materials taking advantage of the surface characteristics of the polyisobutylene sequences, as coatings, as asphalt blends, and in various plastic blends.

The interest of incorporating p-alkylstyrene in polymers is due to its versatility to access a broad range of functional groups. The benzylic protons are ready for many chemical reactions which introduce functional groups at the benzylic position under mild reaction conditions. The oxidation of alkylbenzene to carboxylic acids has been widely studied (see Onopchenkov et al., J. Org. Chem. 37, 1414, 1972 and Ferrari, et al., Macromolecules, 24, 6340, 1991). The halogenation of benzylic systems is also a well-established chemistry (see Mohanraj, et al., Macromolecules, 19, 2470, 1986; Pini, et al., Macromolecules, 20, 58, 1987, Jones et al., Polymer, 31, 1519, 1990). Some reports have also shown the effective metallation reactions to form a benzylic anion in alkylbenzene species (see Nagasaki, eta al., Makromol. Chem., Rapid Commun., 7, 437, 1986 and Bonaccorsi, Roggero et al., Polymer International, 30, 93, 1993). In addition, the further conversion of halogenated and metallated products significantly broaden the scope of functional groups in polymers to almost all the desirable organic functional groups. The benzylic halogen functionality constitutes a very active electrophile that can be converted to many other functionalities via nucleophilic substitution reactions. This functionalization route has long been recognized and the chemical literature is replete with examples of these reactions. "Clean" conversions in high yield to many functionalities, including the following have been reported: aldehyde, carboxy, amide, ether, ester, thioester, thioether, alkoxy, cyanomethyl, hydroxymethyl, thiomethyl, aminomethyl, cationic ionomers (guaternary ammonium or phosponium, s-isothiouronium, or sufonium salts), anionic ionomers (sulfonate and carboxylate salts), etc. In addition, the literature describes many examples in which a benzylic halogen is replaced by a cluster of other functionalities by nucleophilic substitution with a multifunctional nucleophile such as: triethanol amine, ethylene polyamines, malonates, etc. Nearly all of this previous work has been with simple, small (i.e. non-polymeric) molecules containing an aromatic halomethyl (or benzylic) functionality. However, a considerable amount of art also exists on nucleophilic substitution reactions involving chloromethyl styrene and polystyrenes containing aromatic chloromethyl groups to introduce other functionalities. Much of this work involves reactions with "styragels", or lightly cross-linked polystyrenes containing various amounts of benzylic chlorine (see Camps et al., Macromol Chem. Physics, C22(3), 343, 1982–83; Montheard et al., Rev. Macromol. Chem. Phys., (C-28, 503, 1988; and Chemical Modification of Polymers Via Phase Transfer Catalysis by J. M. J. Frechet in "Crown Ethers and Phase Transfer Catalysts in Polymer Science", edited by Matthews and Canecher and Published by Plenum Press, N.Y., 1984).

It is well-known that most of polyolefins are produced by coordination polymerization using transition metal catalysts, commonly known as Ziegler-Natta catalysts (see J. Boor, Jr., Ziegler-Natta Catalysts and Polymerizations; Academic Press: New York, 1979). In recent years, the new developments in metallocene homogeneous catalysts (see Kaminsky et al, U.S. Pat. No. 4,542,199; Ewen et al, U.S. Pat. No. 4,530,914; Slaugh et al, U.S. Pat. No. 4,665,047; Turner, U.S. Pat. No. 4,752,597; Canich et al, U.S. Pat. No. 5,026,798 and Lai et al, U.S. Pat. No. 5,272,236) provide a new era in polyolefin synthesis. With a well-defined (single-site) catalyst, monomer insertion can be effectively controlled. The reaction is especially important for copolymerization reactions. Several prior art disclosures have shown the use of metallocene catalysts with constrained ligand geometry producing linear low density polyethylene (LLDPE) with narrow composition distribution and narrow molecular weight distribution. The relatively opened active site in a metallocene catalyst provides equal access for both comonomers. The incorporation of olefin comonomer is significantly higher than those obtained from tranditional Ziegler-Natta catalysts. In addition, the prior art has identified the cationic coordination mechanism responsible for the polymerization reaction conducted in the presence of the single site catalysts. Both cationic active site insertion mechanism and effective copolymerization of comonomers are very important and favorable for the incorporation of para-alkylstyrene in polyolefins.

Although useful in many commercial applications, polyolefins, such as high density polyethylene (HDPE) and isotactic polypropylene (i-PP), suffer a major deficiency, i.e., poor interaction with other materials. The inert nature of polyolefins significantly limits their end uses, particularly, those in which adhesion, dyeability, paintability, printability or compatibility with other functional polymers is paramount. Unfortunately, polyolefins have been the most difficult materials in chemical modifications, both in functionalization and graft reactions. In post-polymerization, the inert nature and crystallinity of the polymer usually cause the material to be very difficult to chemically modify under mild reaction conditions. In many cases, the reaction involves serious side reactions, such as degradation in the polypropylene modification reaction. In the direct polymerization, only a Ziegler-Natta process can be used in the preparation of linear polyolefins. It is normally difficult to incorporate functional group-containing monomers into the polyolefins by Ziegler-Natta catalysts due to catalyst poisons (see J. Boor, Jr., Ziegler-Natta Catalysts and Polymerizations; Academic Press: New York, 1979). Our previous inventions (see Chung et al, U.S. Pat. No. 4,734,472; 4,751,276; 4,812,529; 4,877,846) have taught the uses of borane-containing polyolefins. The chemistry involves the direct polymerization by using organoborane-substituted monomers and $\alpha$-olefins in Ziegler-Natta processes. The homo- and copolymers containing borane groups are very useful intermediates to prepare a series of functionalized polyolefins. Many new functionized polyolefins with various molecular architectures have been obtained based on this chemistry. In addition, it has been demonstrated that the polar groups can improve the adhesion of polyolefin to many substrates, such as metals and glass (see Chinsirikul et al, J. Thermoplastic Composite Materials 6, 18, 1993 and Lee et al, Polymer, 35, 2980, 1994). The chemistry of borane containing polymers has also been extended to the preparation of polyolefin graft copolymers, which involves free radical graft-from reaction (see Chung et al, U.S. Pat. No. 5,286,800, 1994). In polymer blends, the incompatible polymers can be improved by adding a suitable polyolefin graft copolymer which reduces the domain sizes and increases the interfacial interaction between domains (see Chung et al, Macromolecules 26, 3467, 1993; Macromolecules, 27, 1313, 1994).

SUMMARY OF THE INVENTION

In accordance with the present invention applicants have discovered copolymers which are versatile in the interconversion to functional polymers. The copolymers comprising the direct reaction product of $\alpha$-olefin having from 2 to 12 carbon atoms and p-alkylstyrene (para-alkylstyrene) in which the copolymer has a substantially homogeneous compositional distribution. The copolymer formula is illustrated below:

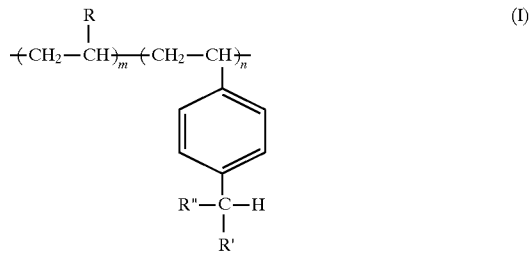

in which R, R' and R" are, independently, either hydrogen, or primary or secondary alkyl groups. Preferably, R is hydrogen or a $C_1$ to $C_{10}$ linear and branched alkyl group, and most preferably R is hydrogen or a $C_1$ to $C_3$ alkyl group. Preferably R' and R" are hydrogen, or $C_1$ to $C_5$ primary or secondary alkyl, and most preferably R' and R" are hydrogen. In the copolymer composition, the $\alpha$-olefin mole % (m) is between about 5 and 99.9. Preferably, m is between 85 and 99.9, and most preferably m is between 95 and 99.9. The sum of m and n (mole % of para-alkylstyrene) is 100. The copolymers have a number average molecular weight (Mn) of at least about 1,000, and preferably at least about 10,000. The copolymers typically have a ratio of weight average molecular weight (Mw) to number average molecular weight, or Mw/Mn, of less than about 8. Preferably, the copolymers have a ratio of weight average molecular weight to number average molecular weight of less than 5, more preferably less than about 4, and most preferably less than about 2.5.

In accordance with another aspect of the present invention, applicants have also discovered a process for producing a copolymer (I) of $\alpha$-olefin having from 2 to 12 carbon atoms and para-alkystyrene in which the copolymer has a substantially homogeneous compositional distribution. The catalysts preferably employed in the production are single-site metallocene catalysts, which have a constrained ligand geometry and a relatively opened active site available for the insertion of both the $\alpha$-olefin and the p-alkylstyrene monomers. In addition, the cationic nature of active site provides a favorable condition for the insertion of p-alkylstyrene. In fact, the reactivity of p-methylstyrene is significantly higher than that of styrene. Preferred catalyst complexes include Zirconocene and Titanocene compounds with single or double cyclopentadienyl derivatives which form the constrained ligand geometry. The catalyst further comprises an activating cocatalyst which usually is a Bronsted acid salt with noncoordinating anion. By mixing $\alpha$-olefin and p-alkylstyrene monomers in a reactor in the presence of a diluent and metallocene catalyst, the copolymerization will take place under inert atmosphere conditions. The copolymerization can be terminated when desired by the addition of isopropanol to destroy the active metal species. These copolymers can be isolated from solution by simple filtration and washing repeatedly with isopropanol.

In accordance with another embodiment of the present invention, applicants have also discovered functionalized copolymers of α-olefin having from 2 to 12 carbon atoms and para-alkystyrene. The formula of the functionalized copolymer is shown below:

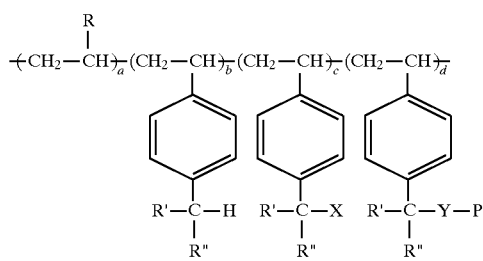

in which R, R' and R", independently, are hydrogen or primary or secondary alkyl groups; X comprises a functional group, such as —COOH, —OH, —SH, —NH$_2$, —Cl, —Br, —M, —COOM (M=metals, e.g. Li, Na, K and Ca) and anhydrides; P comprises a polymer having the molecular weight of at least about 500, which can be derived from both step and chain polymerization reactions; Y is a chemical linkage between polymer P and para-alkystyrene side chain, which is also a residue derived from graft reaction; and the combination of a+b+c+d represents the empirical formula of a substantially random functional polymer, where a ranges from about 50 to about 100,000, b, c and d range from 0 to about 10,000, and the sum of c+d is at least 1.

Preferably, R is hydrogen or $C_1$ to $C_{10}$ linear and branched alkyl, and most preferably R is hydrogen or $C_1$ and $C_3$ linear or branched alkyl. R' and R" preferably are hydrogen or $C_1$ to $C_5$ primary or secondary alkyl, and most preferably R' and R" are hydrogen. In the above formula, the residue includes a simple chemical bond or a functional group, such as an ether, ester, amide and imide.

DETAILED DESCRIPTION

Figure 1:
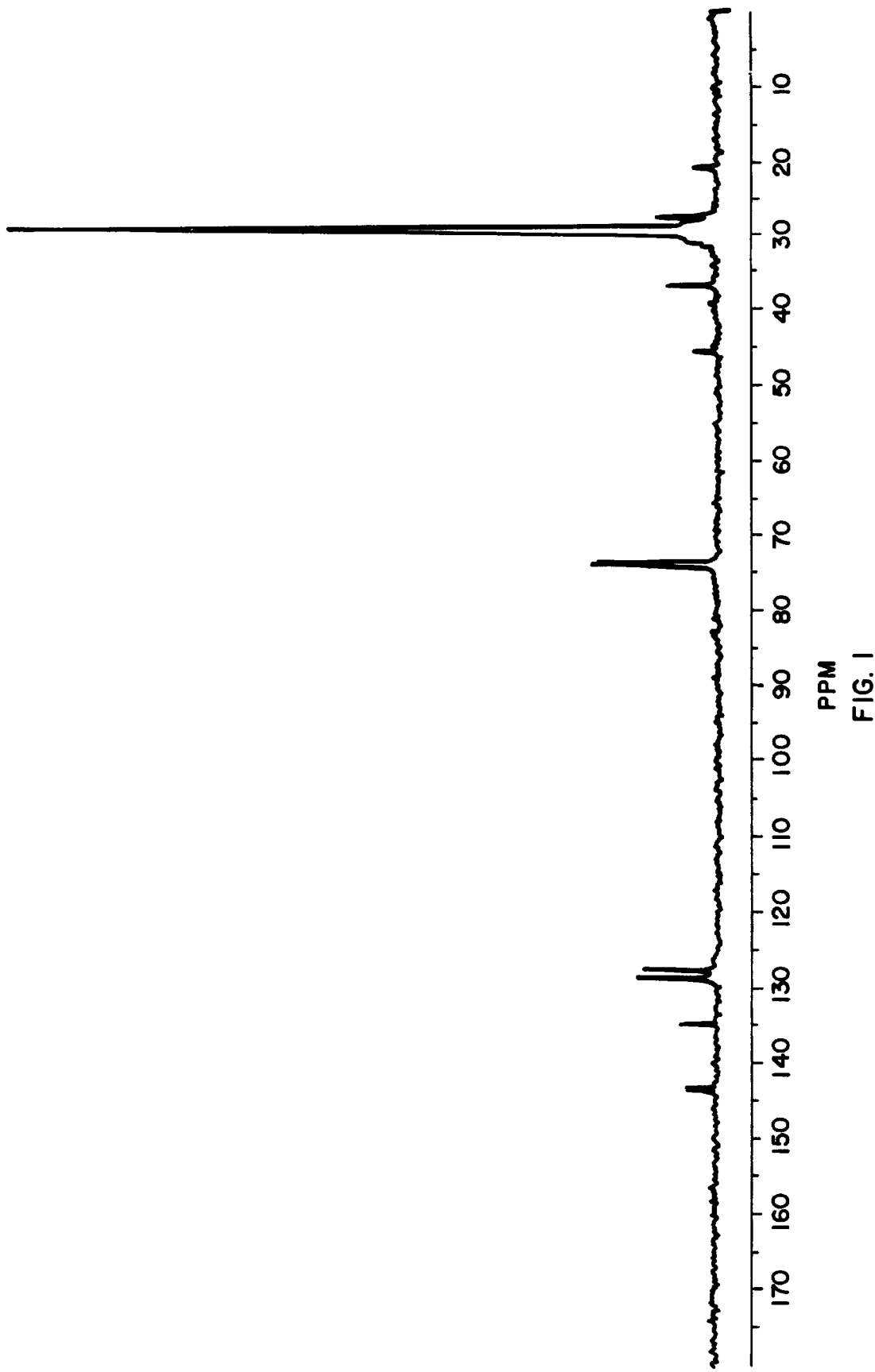
FIGS. 1 and 2 show the $^{13}$C-NMR spectra of poly(ethylene-co-p-methylstyrene) and poly(ethylene-co-styrene) prepared according to Examples 21 and 22, respectively, herein.

This invention is initially based upon the discovery that an effective copolymerization reaction of α-olefin and p-alkylstyrene will take place under some transition metal catalyst conditions. Especially, the use of metallocene catalyts with constrained ligand geometry offer unexpectedly high comonomer reactivity. This type of copolymerization reaction now permits one to produce copolymers which comprise the direct reaction product with uniform copolymer compositional distributions and high comonomer incorporations. The copolymers of α-olefin and p-alkylstyrene are very useful materials by themselves and are also versatile intermediate compounds for interconversion to functionalized polyolefins with various functional groups and functional group concentrations.

The copolymers comprise the direct reaction product of α-olefin having from 2 to 12 carbon atoms and p-alkylstyrene in which the copolymers have a substantially homogeneous compositional distribution. The copolymer formula is illustrated below:

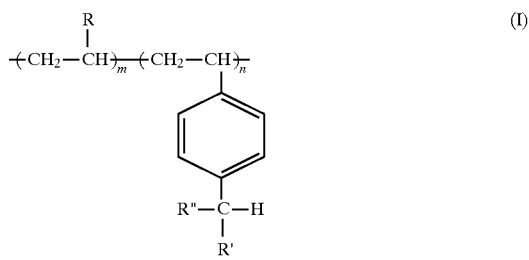

(I)

in which R, R' and R" are independently, either hydrogen, or primary or secondary alkyl groups. Preferably, R is hydrogen or a $C_1$ to $C_{10}$ linear and branched alkyl group, and most preferably R is hydrogen or a $C_1$ and $C_3$ alkyl group. Preferably, R' and R" are hydrogen or $C_1$ to $C_5$ primary or secondary alkyl, and most preferably R' and R" are hydrogen. With respect to the ratio of the monomers employed to produce these copolymers, it is a distinct advantage of the present invention that a very wide range of the ratio of the monomers in the copolymer product can be achieved in accordance with this invention. In the copolymer composition, the α-olefin mole % (m) is between about 5 and 99.9. Preferably, m is between 85 and 99.9, and most preferably m is between 95 and 99.9. The sum of m and n (mole % of para-alkylstyrene) is 100. These copolymers, as determined by gel permeation chromatography (GPC), nuclear magnetic resonance (NMR) and differential scanning calorimetry (DSC) demonstrate narrow molecular weight distributions and substantially homogeneous compositional distributions or compositional uniformity over the entire range of compositions thereof. The copolymers have high molecular weights, and in particular have a number average molecular weight (Mn) of at least about 1,000, and preferably at least about 10,000. In addition, these products also exhibit a relatively narrow molecular weight distribution. In particular, these copolymers exhibit a ratio of weight average molecular weight (Mw) to number average molecular weight, or Mw/Mn value, of less than about 8, preferably less than about 5, more preferably less than about 4, and most preferably less than about 2.5.

The general process for producing α-olefin and p-alkylstyrene copolymers in accordance with the invention is illustrated in equation 1.

Equation 1

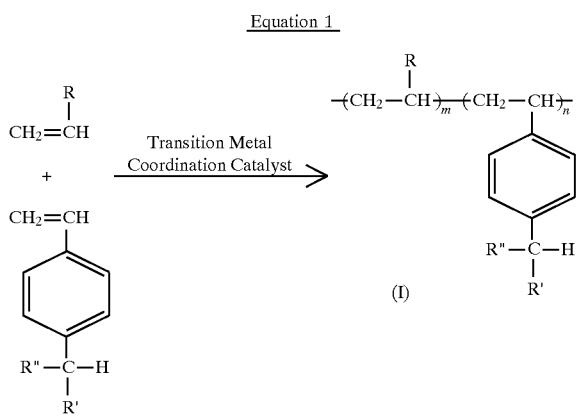

in which R, R', R", m and n are as defined above, and in which the copolymer product (I) has a number average molecular weight (Mn) of at least about 1,000, and preferably at least about 10,000.

As expected, the copolymerization of α-olefin and p-alkylstyrene (such as p-methylstyrene) using traditional Ziegler-Natta catalysis is not very effective. Only a very low % of p-methylstyrene can be incorporated into polyolefin structures. Usually, the copolymerization reaction takes place by mixing at α-olefin and p-alkylstyrene monomers in a reactor in the presence of a diluent and Ziegler-Natta catalyst under inert atmosphere conditions. The polymer solution is very dependent on the α-olefin that is used. For example, when 1-octene is used, a homogeneous solution is observed through the whole copolymerization reaction. On the other hand, almost immediately, a white precipitate could be seen when ethylene and propylene are used as the α-olefin monomer.

On the other hand, α-olefin and p-alkylstyrene are readily copolymerized with single-site metallocene catalysts. The cationic coordination copolymerization of the p-alkylstyrene (especially p-methylstyrene) and α-olefin is very effective in producing products with a relatively narrow composition distribution and narrow molecular weight distribution. In particular, these copolymers exhibit a ratio of weight average molecular weight (Mw) to number average molecular weight, or Mw/Mn value, of less than about 8, preferably less than about 5, more preferably less than about 4, and most preferably less than about 2.5. The copolymers have high molecular weights, and in particular have a number average molecular weight (Mn) of at least about 1,000, and preferably at least about 10,000. The α-olefin mole % (m) is between about 5 and 99.9. Preferably, m is between 85 and 99.9, and most preferably m is between 95 and 99.9. The sum of m and n (mole % of p-alkylstyrene) is 100. The cationic nature of the active site and the constrained ligand geometry of the metallocene catalyst provides a favorable condition for the insertion of p-alkylstyrene. In fact, the reactivity of p-methylstyrene is significantly higher than that of styrene. One advantage of the use of metallocene catalyst in the present α-olefin and p-alkylstyrene copolymerization reaction is that the p-alkylstyrene reactivity is very close to that of the α-olefin over a broad range of polymerization conditions. Therefore, substantially truly random copolymers are produced with the polymer composition being similar to the feed composition, independent of conversion. Furthermore, the use of p-alkylstyrene, e.g., p-methylstyrene, as a comonomer with α-olefin permits high molecular weight copolymers to be produced, at high conversion of both monomers, over the entire composition range, with polymer composition being directly determined by the feed composition, rather than also being a function of conversion and other variables.

Suitable metallocene catalysts shall have a delocalized π-bonded moiety with a constrained ligand geometry. The catalysts may be further described as a metal coordination complex comprising a metal of groups IVB-VIB of the Periodic Table of the elements and a delocalized π-bonded moiety with a constrained geometry. Some of these catalysts have been taught in U.S. Pat. Nos. 4,542,199; 4,530,914; 4,665,047; 4,752,597; 5,026,798 and 5,272,236. Preferred catalyst complexes include Zirconocene and Titanocene coordination compounds with single or double cyclopentadienyl derivatives which form the constrained ligand geometry. The catalyst further comprises an activating cocatalyst, which usually is a Bronsted acid salt with noncoordinating anion. The amount of such catalysts that is used in the preparation of the present copolymers generally ranges from about 20 ppm to 1 wt. %, and preferably from about 0.001 to 0.2 wt. %, based upon the total amount of monomer to be polymerized.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane, etc.

The copolymers of the present invention can prepared by means of a slurry process wherein a slurry of polymer is formed in the diluents employed, or by means of a solution process wherein a homogeneous copolymer solution is formed, depending on the α-olefin used. The use of a slurry process is, however, preferred, since in that case lower viscosity mixtures are produced in the reactor, and slurry concentrations of up to 40 wt. % of polymer are possible. At higher slurry concentrations it is possible to operate a more efficient process in which it is necessary to recycle less of the reactants and diluent for each unit of polymer produced.

In general, the polymerization reactions of the present invention are carried out by mixing p-alkystyrene (typically p-methylstyrene) and α-olefin (typically ethylene or propylene with constant pressure) in the presence of the catalyst and diluent in a copolymerization reactor, with thorough mixing, and under copolymerization conditions, including means for controlling the reaction temperature to between 0° to about 65° C. In particular, the polymerization may be carried out under batch conditions, such as in an inert gas atmosphere and in the substantial absence of moisture. Preferably the polymerization is carried out continuously in a typical continuous polymerization process with inlet pipes for monomers, catalysts and diluents, temperature sensing means and an effluent overflow to a holding drum or quench tank. The overall residence time can vary, depending upon, e. g., catalyst activity and concentration, monomer concentration, reaction temperature and monomer conversion, and generally will be between about thirty minutes and five hours, and preferably between about 1 and 2 hours.

One major advantage of the α-olefin and p-alkyylstyrene copolymers (I) is the versatility of benzylic protons in p-alkylstyrene unit which selectively can be converted to various functional groups under mild reaction conditions. The general functionalized copolymers of αolefin and p-alkylstyrene are illustrated below, in which the copolymers have a substantially homogeneous compositional distribution:

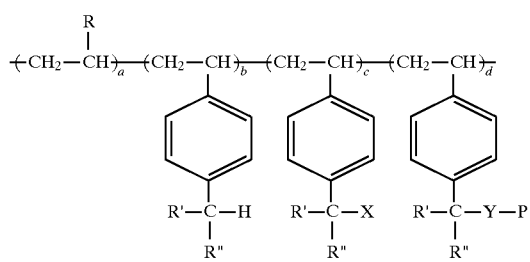

(II)

in which R, R' and R", independently, are hydrogen or primary or secondary alkyl groups; X comprises a functional group, such as —COOH, —OH, —SH, —NH$_2$, —Cl, —Br, —M, —COOM (M=metals, e.g. Li, Na, K and Ca) and anhydrides; P comprises a polymer having the molecular weight of at least about 500, which can be derived from both step and chain polymerization reactions; Y is a chemical linkage between polymer P and para-alkystyrene side chain, which is also a residue derived from graft reaction; and the combination of a+b+c+d represents the empirical formula of a substantially random functional polymer, where a ranges from about 50 to about 100,000, b, c and d range from 0 to about 10,000, and the sum of c+d is at least 1.

Preferably, R is hydrogen or C$_1$ to C$_{10}$ linear and branched alkyl, and most preferably R is hydrogen or C$_1$ and C$_3$ linear or branched alkyl. R' and R" preferably are hydrogen or C$_1$ to C$_5$ primary or secondary alkyl, and most preferably R' and R" are hydrogen. In the above formula, the residue includes a simple chemical bond or a functional group, such as an ether, ester, amide and imide.

In the above formula, the polymer segments P may be derived from anionically polymerizable monomers, free radically polymerizable monomers, anionically and cationically ring-openable monomers or oxidatively coupleable monomers. Suitable anionically polymerizable monomers include, for example, vinyl aromatic compounds, such as styrene and alkyl-substituted styrenes, vinyl unsaturated amides, such as acrylamide and methacrylamide, vinyl unsaturated nitrites, such as acrylonitrile and methacrylonitrile, vinyl unsaturated esters such as alkyl acrylates (e.g., methylacrylate) and alkyl methacrylates (e.g., methylmethacrylate), conjugated dienes, such a butadiene and isoprene, vinyl pyridines and the like. Mixtures of such anionically polymerizable monomers also may be used.

Suitable free radically polymerizable monomers include, for example, olefins, such as ethylene, vinyl aromatic compounds, acrylates and methacrylates, vinyl esters such as vinyl acetate, acrylamides and methacrylamides, acrylonitrile and methacrylonitrile. Mixtures of such compounds also may be used.

Suitable anionically and cationically ring-openable monomers include, for example, cyclic ethers, sulfides, lactones, lactams and n-carboxyanhydrides. Specific, non-limitive examples of such compounds include β-propiolactone, β-butyrolactone, ε-valerolactone, glycolide, lactide, ε-caprolactone, α-acetolactam, β-propiolactam, α-pyrrolidone, γ-butyrolactam, ε-caprolactam, ethylene oxide, propylene odide, epichlorohydrin, oxetane, tetrahydrofuran and octamethylcyclotetrasiloxane.

Suitable oxidatively coupleable monomers include, for example, dicarboxylic acids, diols, polyols, diamines, ω-aminoacids, diisocyanates, unsaturated acids, anhydrides and dianhydrides.

Specific, non-limitive examples of such compounds include terephthalic acid, dimethylterephthalate, adipic acid, p-hydroxybenzoic acid, dodecanedioic acid, isophthaloyl chloride, terephthaloyl chloride, ehtylene glycol, poly (ethylene glycol), 1,4-butanediol, bisphenol A, epichlorhydrin, tolylene diisocyanate, hexamethylene diisocycnate, 4,4'-diaminodiphenyl ether, hexamethylene diamine, m-phenylene diamine, p-phenylene diamine, ω-aminoundecanoic acid, maleic anhydride, phthalic anhydride and pyromettitic dianhydride.

The chemical linkage Y is a residue from a graft reaction and may be a simple chemical bond or a residue of a linked nuclophile or functional group, such as an ether, ester, amide or imide group. Specific, non-limiting examples of Y include

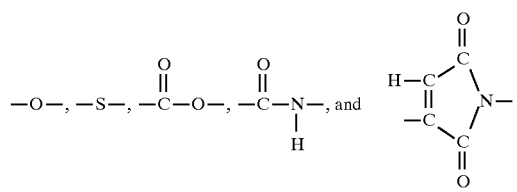

All functionality introducing reactions in α-olefin/p-alkylstyrene copolymers are post-polymerization chemical modification processes which can be run on bulk recovered polymer, and can also be run on polymer solution (homogeneous or in a finely dispersed slurry) after suitable quenching and removal of residual monomers. Most functionalization reactions of benzylic protons in both organic compounds and poly(p-alkylstyrene) known in the prior art can be applied to α-olefin/p-alkylstyrene copolymers with some modifications to enhance the mixing of reagents. Usually, bulk reactions can be effected in an extruder, or mixer, suitably modified to provide adequate mixing. Such bulk reactions have the advantage of permitting complete removal of residual unreacted p-alkylstyrene by conventional finishing operations prior to chemical modification, and of avoiding possible diluent reactions to which produce undesired side products. Solution processes are advantageous in that they permit good mixing and control of the modification conditions to be achieve, as well as relatively easy removal of undesired by-products. Disadvantages of solution processes include the need for removal of residual unreacted para-alkylstyrene prior to chemical modification reactions.

The following equation 2, involvinging (but not limited) oxidation, halogenation and metallation reactions of poly(α-olefin-co-p-methylstyrene), is used to illustrated the functionalization reactions of benzylic protons in the copolymers of α-olefin and p-alkylstyrene.

Equation 2

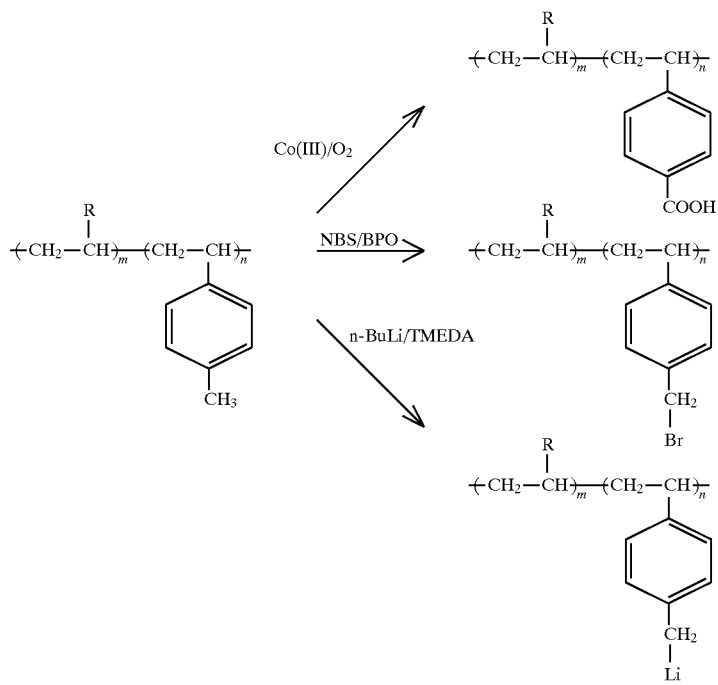

In the above equation 2, R is either hydrogen or primary or secondary alkyl. Preferably, R is hydrogen or $C_1$ to $C_3$ linear or branched alkyl. The α-olefin mole % (m) is between about 5 and 99.9. Preferably, in is between 85 and 99.9, and most preferably m is between 95 and 99.9. The sum of m and n (mole % of p-alkylstyrene) is 100. The copolymer having a number average molecular weight (Mn) of at least about 1,000, and preferably at least about 10,000. The copolymers also typically have a ratio of weight average molecular weight (Mw) to number average molecular weight, or Mw/Mn of less than about 8, preferably less than about 5, more preferably less than about 4, and most preferably less than about 2.5.

An example of chemical modification reaction is halogenation (e. g., radical bromination) to produce the very versatile benzylic halogen-functional copolymers described herein. The surprising ease and highly, elective nature of radical halogenation to introduce a benzylic halogen, and the great versatility of the benzylic halogen, makes this a most preferred modification reaction. The halogenation reaction can be carried out in the bulk phase or in solution (homogeneous or in a finely dispersed slurry) using bromine, N-bromosuccinimide, sodium hypochlorite or sodium hyprobromite as typical halogenating agents. Bulk halogenation can be effected in an extruder, or mixer, suitably modified to provide adequate mixing. It has the advantages of permitting complete removal of residual unreacted p-alkylstyrene by conventional finishing operations prior to halogenation, and of avoiding possible diluent halogenation as an undesired side reaction. Solution halogenation is advantageous in that it permits good mixing and control of halogenation conditions to be achieved, easier removal of undesired halogenation by-products, and a wider range of initiators of halogenation be employed. Its disadvantages include the need for removal of residual unreacted p-alkylstyrene prior to halogenation, the presence of complicating side reactions involving solvent halogenation, and a solution step if a non-solution polymerization process is used to prepare the copolymer, as well as removal, clean-up and recycle of the solvent. Suitable solvents for such halogenation include the low boiling hydrocarbons ($C_4$ to $C_7$) and halogenated hydrocarbons. The halogenation can be effectively conducted with the copolymer (such as PE and PP copolymers with high crystallinities) as a fine slurry in a suitable diluent, due to the high surface area of p-alkylstyrene units located in the amorphous phases.

It has rather surprisingly been found that radical halogenation, e.g., bromination, of the enchained para-alkylstyryl moiety in the copolymers of this invention can be made highly specific with almost exclusive substitution occurring on the para-alkyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.). Thus, solutions of the p-alkylstyrene/α-olefin copolymers of this invention in hydrocarbon solvents such as pentane, hexane or heptane can be selectively brominated using light, heat, or selected radical initiators (according to conditions, i. e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scisson. It is believed that the bromination reaction proceeds by means of a rapid radical chain reaction with the chain carrier being, alternatively, a bromine atom and a benzylic radical resulting from hydrogen atom abstraction from a para-alkyl group on the enchained para-alkyl styryl moiety. Since little tertiary benzylic bromine is produced in the copolymer molecule, the potential dehydrohalogenation reaction will be almost entirely eliminated therein. In addition, presence of the bromine on the para-alkyl group leads to several additional significant advantages with respect to this product. Firstly, it permits functionalization by substitution of other functional groups at that site. More particularly, the highly reactive nature of the halogen in the haloalkyl group attached to an aromatic ring makes it a particularly desirable functionality to extend the usefulness of these copolymers in a range of applications. The presence of aromatic haloalkyl groups in the copolymer permits cross-linking in a variety of ways under mild conditions.

The above-described functional polymers in equation 2 are susceptible to further reactions, including further polymerization. In other words, another type of functional polymer having graft copolymer structure can be easily prepared from the α-olefin and p-alkylstyrene copolymers under mild reaction conditions. Both graft-from and graft-onto reactions can be applied to produce polyolefin graft copolymers which have polyolefin backbone and several polymer chains (as the side chains) randomly bonded to the polyolefin backbone. Equation 3 shows two examples and illustrates both graft-onto and graft-from reaction schemes:

acrylamides, alkyl acrylates and methacrylates, and conjugated dienes, such as isoprene and butadiene; Y is a chemical linkage between polymer P and para-alkystyrene side chain, which is the residue derived from graft reaction (the residue includes a simple chemical bond or a functional group, such as ether, ester, amide and imide functionalities); m (the α-olefin mole %) is between about 5 and 99.9 (preferably, m is between 85 and 99.9, and most preferably m is between 95 and 99.9); and the sum of m and n (mole % of para-alkylstyrene) is 100.

In general, the graft-from reaction offers a relatively simple process for the preparation of graft copolymers. One favorable example shown in equation 3 is the anionic graft-from reaction. The lithiated polymer obtained from equation 2 is usually purified to remove unreacted alkyl lithium which can produce undesirable ungrafted homopolymers. The purification is conviently carried out by washing the lithiated polymer powders several times with hexane. The purified lithiated polyolefin powders are then suspended in an inert organic diluent before addition of monomers, which includes all anionically polymerizable monomers, such as those disclosed in Macromolecular Reviews, Vol-

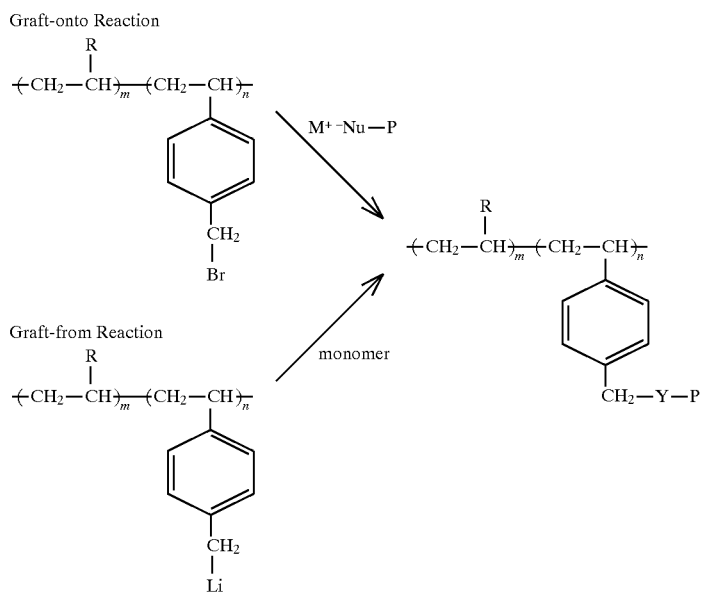

in which R is hydrogen or $C_1$ to $C_{10}$ linear or branched alkyl, and most preferably hydrogen or $C_1$ to $C_3$ alkyl; P comprises a polymer having the molecular weight of at least about 500, which can be derived from both step and chain polymerization reactions; M is a metal ion, such as an alkali or alkaline earth metal ion, or an onium ion, such as tetraalkylammonium; Nu is a nucleophilic functional in which R is hydrogen or $C_1$ to $C_{10}$ linear or branched alkyl, and most preferably hydrogen or $C_1$ to $C_3$ alkyl; P comprises a polymer having the molecular weight of at least about 500, which can be derived from both step and chain polymerization reactions; M is a metal ion, such as an alkali or alkaline earth metal ion, or an onium ion, such as tetraalkylammonium; Nu is a nucleophilic functional group which can perform a well-known condensation reaction with benzylic halide; monomer represents a monomer which is susceptible to anionic polymerization, such as, for example, vinyl aromatic compounds, such as styrene and alkyl substituted styrene, ume 2, Interscience Publishers Inc. (1967), entitled "Monomers Polymerized by Anionic Initiators" and in Anionic Polymerization, ACS Symposium Series 166, American Chemical Society (1981). Typical anionically polymerizable monomers which may be reacted with the lithiated polyolefin powders include, for example, vinyl aromatic compounds, such as styrene and alkyl-substituted styrene, vinyl unsaturated amides, such as acrylamides, alkyl acrylates and methacrylates, conjugated dienes, such as butadiene and isoprene, vinyl unsaturated nitrites, such as acrylonitrile and methacrylonitrile, vinyl pyridines and mixtures thereof. With the coexistance of polymeric anions and monomers susceptible to anionic polymerization, a living anionic polymerization takes place as well-known solution anionic polymerization, described, for example, by R. Milkovich et al in U.S. Pat. No. 3,786,116. It is important to note that the anionic polymerization of various monomers, such as methyl methacrylate, can take place at room temperature without causing any detectable side reactions, which may be associated with the stable benzylic anion in solid form. After achieving the desirable composition of the graft copolymer, the graft-from reaction can be terminated by the addition of an alcohol, such as methanol, to the reaction mixture. In addition, the living anionic chain ends can be converted to a variety of functional groups by controlled termination reactions with a number of electrophiles, including ethylene oxide, propylene oxide, episulfides and carbon dioxide before adding a proton source. The termination reactions are very effective at room temperature. However, a slight molar excess of the terminating agent usually is used to assure complete termination. A wide range of polymers, including random and block copolymers, with well-defined molecular weight and narrow molecular weight distribution, can be prepared by anionic polymerization. In this well-controllable living graft-from reaction manner, a variety graft of copolymers with well-defined side chain segments have been produced.

The following examples are illustrative of the invention.

EXAMPLE 1

Synthesis of Poly(ethylene co-p-methylstyrene)

In an argon filled dry-box, 100 ml of toluene, 1.5 g (7.5 mmol in Al) methylaluminoxane (MAO) (30 wt % in toluene) and 2.10 g (17.4 mmol) p-methylstyrene were placed into a Parr 450 ml stainless autoclave equipped with a mechanical stirrer. The sealed reactor was then moved out from the dry box and purged with ethylene gas and the solution was saturated with 45 psi ethylene gas at 30° C., the catalyst solution of 2.09 mg (5.0 umol) of ethylene bis (indenyl)zironium dichloride ($Et(Ind)_2ZrCl_2$) in 2 ml of toluene was added under ethylene pressure to initiate the polymerization. Additional ethylene was fed continuously into the reactor to maintain a constant pressure of 45 psi during the whole course of the polymerization. After 60 min, the reaction was terminated by addition of 100 ml of dilute hydrochloric acid (HCl) solution in methanol (MeOH), the polymer was isolated by filtering and washed completely with MeOH and dried under vacuum at 50° C. for 8 hrs. About 3.85 g of copolymers with 1.67 mol % of p-methylstyrene (Tm=125.6° C., Mw=151,800 and Mw/Mn=2.41) was obtained.

EXAMPLES 2–9

Synthesis of Poly(ethylene-co-p-methylstyrene)

In a series of Examples, high molecular weight of ethylene/p-methylstyrene copolymers were prepared by batch slurry polymerization in a Parr 450 ml stainless autoclave equipped with a mechanical stirrer. The reaction procedures described in Example 1 were carried out with the reaction conditions (catalyst, solvent, monomer feeds and reaction time and temperature) as indicated in Table 1. In all copolymerization reactions, $Et(Ind)_2ZrCl_2/MAO$ catalyst was used with 100 ml of solvent, either toluene or hexane. Various reaction temperatures and times were examined to illustrate the effects to the catalyst activity and copolymer composition. The copolymerization reaction were terminated by adding 100 ml of dilute HCl solution in MeOH. The polymers were isolated by filtration, washing completely with MeOH, and drying under vaccum at 50° C. for 8 hrs. The composition, molecular weight and molecular weight distribution of each copolymer was determined by high temperature $^1H$ NMR and gel permeation chromatography (GPC), respectively. The crystallinity (Tm: melting point and H: heat of fusion) was measured by differential scanning calorimetry (DSC).

The results obtained are set forth in Table 1.

TABLE 1

A summary of the copolymerization reactions between ethylene (E) ($m_1$) and para-methylstyrene(pMS) ($m_2$) with $Et(Ind)_2ZrCl_2/MAO$ catalysts.

| Expt. No. | cat. μmol | solvent* ml | Tp °C. | $m_1$/psi | $m_2/10^{-2}$ mol | tp min | Yield g | activity ×10$^{-3}$** | [$M_2$] mol % | conversion wt % | Tm °C. | ΔH J/g | $M_w$ × $10^{-3}$ | $M_w/M_n$ |
|---|---|---|---|---|---|---|---|---|---|---|---|---|---|---|
| control | 5.0 | T/100 | 30 | E/45 | 0 | 60 | 3.22 | 6.44 | 0 | / | 136.8 | 148.7 | 250.4 | 3.67 |
| 1 | 5.0 | T/100 | 30 | E/45 | pMS/1.74 | 60 | 3.85 | 7.70 | 1.67 | 12.5 | 125.6 | 112.7 | 151.8 | 2.41 |
| 2 | 5.0 | T/100 | 30 | E/45 | pMS/3.43 | 60 | 3.78 | 7.56 | 2.98 | 10.8 | 122.6 | 93.9 | 151.5 | 2.25 |
| 3 | 5.0 | T/100 | 30 | E/45 | pMS/6.82 | 60 | 4.39 | 8.78 | 7.04 | 13.1 | 120.0 | 84.0 | 137.6 | 2.14 |
| 4 | 12.5 | T/100 | 30 | E/45 | pMS/6.80 | 120 | 8.62 | 3.45 | 12.46 | 40.4 | 112.3 | 66.9 | 77.00 | 2.03 |
| 5 | 5.0 | T/100 | 50 | E/45 | pMS/3.43 | 60 | 4.48 | 8.96 | 4.28 | 17.5 | 121.6 | 102.1 | 100.0 | 2.47 |
| 6 | 17.0 | T/100 | 50 | E/14.5 | pMS/3.39 | 60 | 9.40 | 5.53 | 4.54 | 39.2 | 118.4 | 75.6 | — | — |
| 7 | 5.0 | H/100 | 30 | E/45 | pMS/3.39 | 60 | 5.58 | 11.20 | 1.65 | 9.21 | 116.1 | 81.9 | — | — |
| 8 | 17.0 | H/100 | 50 | E/45 | pMS/3.43 | 60 | 24.50 | 14.40 | 2.44 | 57.7 | 113.9 | 74.5 | 82.90 | 3.19 |
| 9 | 17.0 | H/100 | 50 | E/45 | pMS/3.39 | 120 | 31.00 | 9.12 | 2.76 | 82.8 | 113.8 | 71.5 | — | — |
| 10 | 5.0 | T/100 | 30 | E/45 | ST/6.82 | 60 | 3.39 | 6.78 | 0.91 | 1.75 | 123.8 | 100.5 | 80.80 | 2.45 |
| 11 | 17.0 | H/100 | 50 | E/45 | ST/3.51 | 60 | 20.42 | 12.01 | 2.20 | 43.1 | 116.5 | 87.5 | — | — |

*Solvents: T (toluene), H (n-hexane)
**g polmer/mol Zr.h

In general, the incorporation of p-methylstyrene in polyethylene was very effective by using $Et(Ind)_2ZrCl_2/MAO$ catalyst. More than 80 mole % p-methylstyrene conversion was achieved in 2 hours reaction time. The cationic nature of the active site and constrained ligand geometry with opened space for comonomer insertion in the $Et(Ind)_2ZrCl_2$ catalyst provides a favorable condition for the insertion of p-alkylstyrene. In fact, the reactivity of p-methylstyrene is significantly higher than that of styrene (will be shown in Examples 10 and 11). From a comparison of the homopolymerization of ethylene (control reaction) and the copolymerization reactions of ethylene/p-methylstyrene (Examples 1–3), the copolymerization activity slightly increases with the increase of p-methylstyrene. It was unexpected to see the solvent effect which shows a significant difference between hexane and toluene. Hexane solvent (Examples 7–9) appears to provide higher catalyst activity and p-methylstyrene conversion. Relatively sharp and uniform GPC and DSC curves for all copolymers demonstrate narrow molecular weight distributions and substantially homogeneous compositional distributions or compositional uniformity over the entire range of compositions thereof.

EXAMPLE 10

Synthesis of Poly(ethylene-co-styrene)

The reaction procedure described in Example 1 was carried out for the copolymerization reaction of ethylene and styrene. To a Parr 450 ml stainless autoclave equipped with a mechanical stirrer, 100 ml of toluene, 1.5 g (7.5 mmol in Al) methylaluminoxane (MAO) (30 wt % in toluene) and 7.2 g (68.2 mmol) of styrene were charged. The sealed reactor was then saturated with 45 psi ethylene gas at 30° C. before adding catalyst solution, 2.09 mg (5.0 umol) of Et(Ind)$_2$ ZrCl$_2$ in 2 ml of toluene, to initiate the polymerization. Additional ethylene was fed continuously into the reactor by maintaining a constant pressure of 45 psi during the whole course of the polymerization. After 60 min, the reacrion was terminated by adding 100 ml of dilute HCl solution in MeOH. The polymer was isolated by filtering and washing completely with MeOH, and drying under vacuum at 50° C. for 8 hrs. About 3.39 g of poly(ethylene-co-styrene) with 0.91 mol % of styrene (Tm=123.8° C., Mw=80,800 and Mw/Mn=2.45) was obtained. The conversion of the styrene was only 1.75%, which is very low compared with the p-methystyrene cases in Examples 1–9.

EXAMPLE 11

Synthesis of Poly(ethylene-co-styrene)

The reaction procedure described in Example 10 was carried out for the copolymerization reaction of ethylene and styrene, except that 35.1 mmol of styrene and 100 ml of hexane were used as comonomer and solvent, respectively. About 20.42 g of PE copolymer with 2.20 mol % of styrene (Tm=116.5° C.) was obtained. The conversion of the styrene was 43.14%. A large solvent effect was quite unexpected. However, the overall incorporation of styrene was still significantly lower than that of p-methylstyrene under similar reaction conditions.

EXAMPLE 12

Synthesis of Poly(ethylene-co-p-methylstyrene)

In an argon filled dry-box, 100 ml of toluene, 2.0 g of triethyl aluminum (AlEt$_3$) solution (0.784 mmol/g in toluene) and 4.0 g (34.3 mmol) p-methylstyrene were placed into a Parr 450 ml stainless autoclave equipped with a mechanical stirrer. The sealed reactor was then moved out from the dry box and purged with ethylene gas. After the solution was saturated with 45 psi ethylene gas at 50° C., 50 mg (17.4 umol Ti) of magnesium dichloride/p-methyl ethylbenzoate/titanium tetrachloride (MgCl$_2$/ED/TiCl$_4$) catalyst slurry in 5 ml of toluene was added under ethylene pressure to initiate the polymerization. Additional ethylene was fed continuously into the reactor to maintain a constant pressure of 45 psi during the whole course of the polymerization. After 60 min., the reaction was terminated by adding 100 ml of dilute HCl solution in MeOH. The polymer was isolated by filtering and washing completely with MeOH, and drying under vacuum at 50° C. for 8 hrs. About 17.95 g copolymers with 0.24 mol % of p-methylstyrene (Tm=134.4° C., Mw=214,200 and Mw/Mn=6.06) was obtained. The conversion of the p-methylstyrene was 4.5%.

EXAMPLE 13

Synthesis of Poly(ethylene-co-p-methylstyrene)

The reaction procedure described in Example 12 was carried out for the polymerization, except that 8.0 g (68.2 mmol) of p-methylstyrene was used as comonomer. About 22.11 g of PE copolymer with 0.44 mol % of p-methylstyrene (Tm=134.0° C., Mw =125,700 and Mw/Mn=5.47) was obtained. The conversion of the p-methylstyrene was 5.02%.

EXAMPLE 14

Synthesis of Poly(propylene-co-p-methylstyrene)

In an argon filled dry-box, 100 ml of toluene, 2.0 g of AlEt$_3$ solution (0.784 mmol/g in toluene), 0.22 g of dimethoxylmethylphenylsilane solution (0.5 mmol/g in toluene) and 4.0 g (34.3 mmol) p-methylstyrene were placed into a Parr 450 ml stainless autoclave equipped with a mechanical stirrer. The sealed reactor was then moved out from the dry box and purged with propylene gas and the solution was saturated with 29 psi propylene gas at 50° C. 50 mg (17.4 umol Ti) of MgCl$_2$/ED/TiCl$_4$ catalyst slurry in 5 ml of toluene was added under propylene pressure to initiate the polymerization. Additional propylene was fed continuously into the reactor to maintain a constant pressure of 29 psi during the whole course of the polymerization. After 60 min, the reaction was terminated by adding 100 ml of dilute HCl solution in MeOH. The polymer was isolated by filtering and washing completely with MeOH, and drying under vacuum at 50° C. for 8 hrs. About 22.40 g of PP copolymers with 0.36 mol % of p-methylstyrene (Tm= 152.9° C., Mw=168,200 and Mw/Mn=5.54) was obtained. The conversion of the p-methylstyrene was 5.63%.

EXAMPLE 15

Synthesis of Poly(propylene-co-p-methylstyrene)

The reaction procedure described in Example 14 was carried out for the polymerization, except that 8.0 g (68.2 mmol) of p-methylstyrene was used as comonomer. About 22.60 g of PP copolymer with 0.48 mol % of p-methylstyrene (Tm=154.3° C., Mw=202,200 and Mw/Mn=6.23) was obtained. The conversion of the p-methylstyrene was 3.73%.

EXAMPLES 16–22

Copolymerization Reactions of Ethylene (M$_1$) and Styrene Derivatives (M2) Using [C$_5$Me$_4$ (SiMe$_2$N$^t$Bu)]TiCl$_2$ Catalyst Following the experimental procedures described in U.S. Pat. No. 5,272,236, both catalysts A and B were prepared. Catalyst A is (tertiary-butyl amido)dimethyl (tetramethyl-η-cyclopentadienyl) silane titanium dichloride ([C$_5$Me$_4$ (SiMe$_2$N$^t$Bu)]TiCl$_2$) and Catalyst B is (tertiary-butyl amido) dimethyl (tetramethyl cyclopentadienyl) Silane titanium dimethyl ([C$_5$Me$_4$(SiMe$_2$N$^t$Bu)]TiMe$_2$) Both catalysts, which are characterized by monocyclopentadienyl highly constrained geometry, were prepared with high yields.

In an argon filled dry-box, 100 ml of toluene, 20 mmol of methylaluminoxane (MAO) and 46.6 mmol of comonomer (i.e. styrene or methyl group substituted styrene derivatives) were placed into a Parr 450 ml stainless autoclave equipped with a mechanical stirrer. The sealed reactor was then moved out from the dry box and purged with ethylene gas and the solution was saturated with 45 psi ethylene gas at designated reaction temperature (30° C. or 25° C.), the catalyst solution of 10 umol of [C$_5$Me$_4$(SiMe$_2$N$^t$Bu)]TiCl$_2$ in 5 ml of toluene was added under ethylene pressure to initiate the polymerization. In most cases, additional ethylene was fed continuously into the reactor to maintain a constant pressure of 45 psi during the whole course of the polymerization. After a reaction time, as indicated in Table 2, the reaction was terminated by addition of 100 ml of dilute HCl solution in MeOH, the polymer was isolated by filtering and washing completely with MeOH, and was dried under vacuum at 60° C. for 12 hrs. The composition of copolymers was determined by $^1$H NMR spectra, and the thermal properties (melting point and crystallinity) were obtained by DSC measurements. The experimental results are summarized in Table 2.

TABLE 2

A Summary of Copolymerization Reactions Between Ethylene ($M_1$) and Styrene Derivatives ($M_2$) by Using [$C_5Me_4(SIMe_2N^tBu)$]$TiCl_2$ Catalyst

| | | Reaction Condition | | | | | Copolymer Product | | | |
|---|---|---|---|---|---|---|---|---|---|---|
| Sample No. | Temp. °C. | Cat. umol | $M_1$ psi | $M_2$** mmol | Reaction time (mm) | Yield (g) | $M_2$ Conc. (mole %) | $M_2$ conversion (%) | Tm (°C.) | Xc (%) |
| 16 | 30 | 10.0 | 45 | none | 60 | 4.27 | 0 | 0 | 133.7 | 51.5 |
| 17 | 30 | 10.0 | 45 | p-MS/46.6 | 60 | 13.0 | 11.0 | 84.3 | 76.0 | 5.40 |
| 18 | 30 | 10.0 | 45 | o-MS/46.6 | 60 | 12.9 | 4.52 | 38.7 | 98.3 | 12.1 |
| 19 | 30 | 10.0 | 45 | m-MS/46.6 | 60 | 5.43 | 2.36 | 9.53 | 119.1 | 23.4 |
| 20 | 30 | 10.0 | 45 | styrene/46.6 | 60 | 13.6 | 5.35 | 48.6 | 98.7 | 10.4 |
| 21 | 25 | 10.0 | 45* | p-MS/46.6 | 6 | 2.1 | 9.5 | 11.69 | | |
| 22 | 25 | 10.0 | 45* | styrene/76.9 | 6 | 2.2 | 10.8 | 8.93 | | |

*ethylene pressure of 45 psi was maintained only in the first minitue of the polymerization.
**p-MS: p-methylstyrene; o-MS: o-methylstyrene; m-MS: m-methylstyrene.

Overall, the experimental results show very similar copolymerization reactivity as those obtained using Et(Ind)$_2$ZrCl$_2$ catalyst. Both catalyst are highly constrained geometry catalyst systems with mono- and di-cyclopentadienyl ligands and both were very effective to incorporate p-methylstyrene into a polyethylene backbone. More than 80% of p-methylstyrene was interconverted to polymer form within one hour reaction time under constant ethylene pressure of 45 psi (Example 17). High comonomer reactivity is very important in the commercial production processes. In addition, the comonomer reactivity of p-methylstyrene is significantly higher than those of its isomers (o-methylstyrene (Example 18) and m-methylstyrene (Example 19)) and styrene (Example 20). Both electronic and steric favorable factors of p-methylstyrene in "cationic" metallocene copolymerization, using constrained geometry catalyst systems, clearly distinguish p-methylstyrene from its isomers and from styrene. The poly(ethylene-co-p-methylstyrene) of Example 17, with 11 mole % of p-methylstyrene, shows low melting point (76° C.) and very small crystallinity (5.4%), which implies the random distribution of p-methylstyrene along the polyethylene backbone. The detail sequence distribution of the poly (ethylene-co-p-methylstyrene) of Example 21 and the poly (ethylene-co-styrene) of Example 22 were quantitatively determined by $^{13}$C NMR spectra, as is discussed in Example 23.

EXAMPLE 23

Structure Characterization of poly(ethylene-co-p-methystyrene and poly(ethylene-co-styrene)

Figure 2:
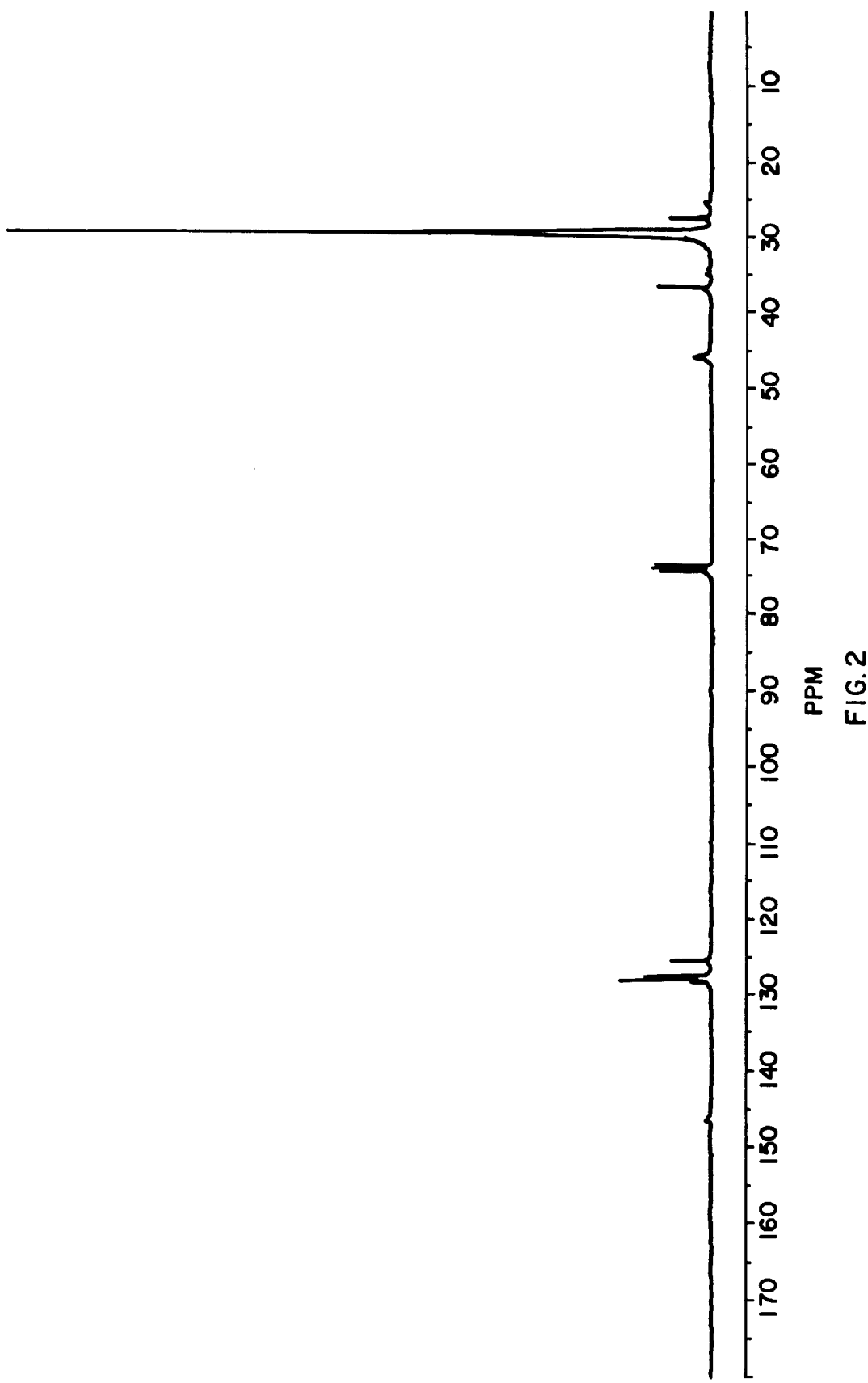
Figure 3:
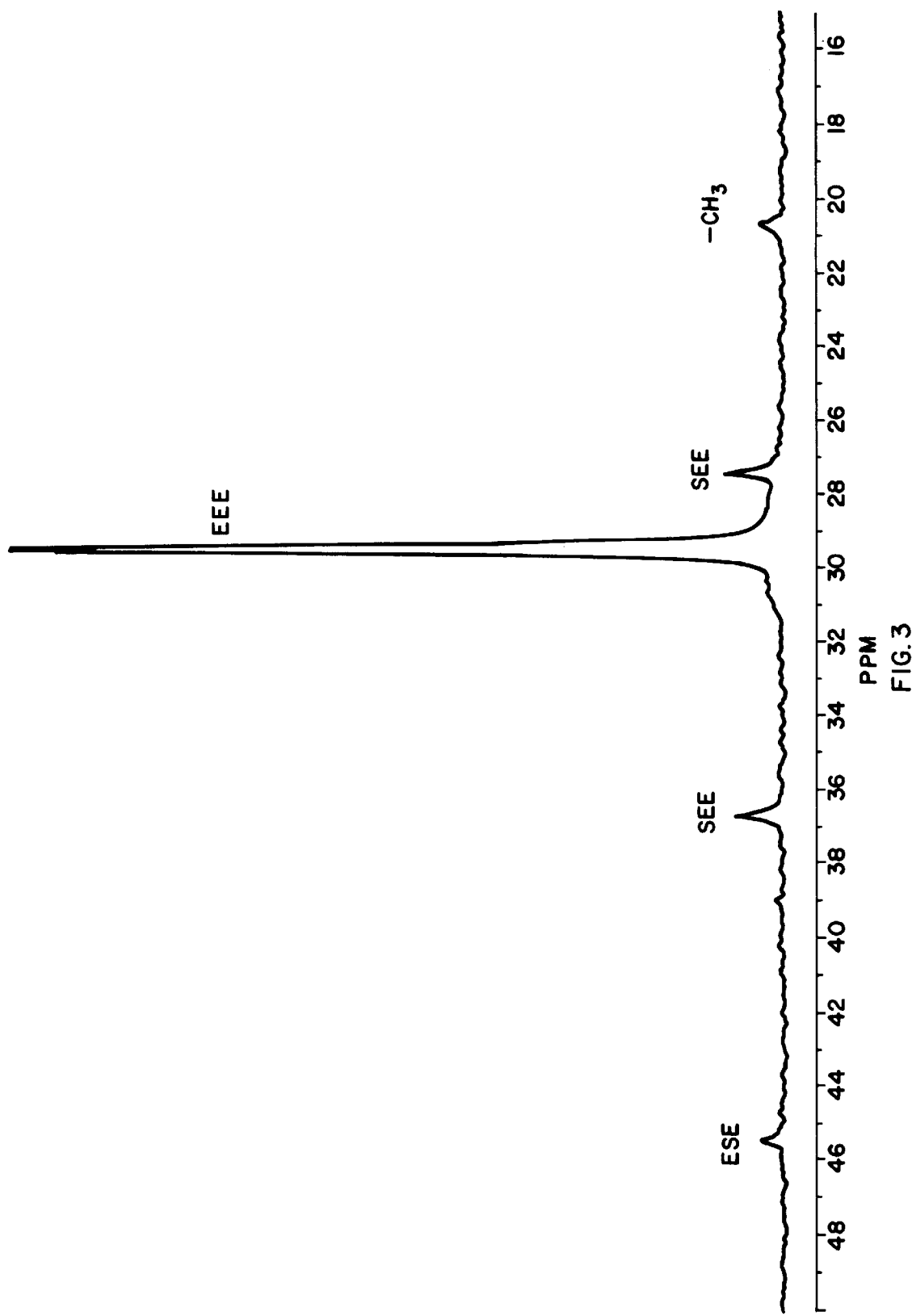
FIGS. 3 and 4 are the expanded $^{13}$C-NMR spectra in the aliphatic region of the poly(ethylene-co-p-methylstyrene) and poly(ethylene-co-styrene) from Examples 21 and 22.
Figure 4:
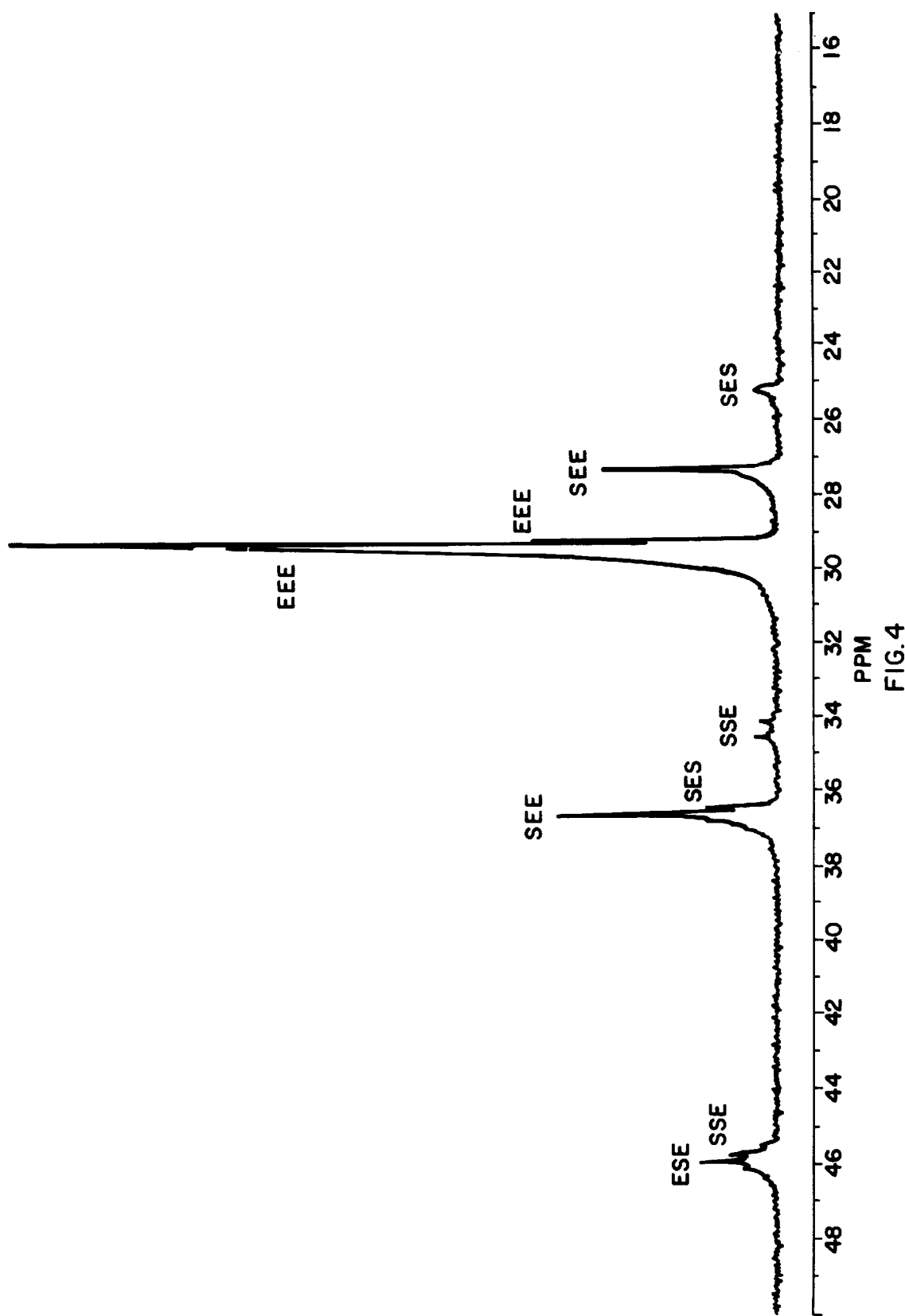

Both poly(ethylene-co-p-methylstyrene) (from Example 21) and poly(ethylene-co-styrene) (from Example 22) were subjected to the detail $^{13}$C NMR studies to determine their microstructures. FIGS. 1 and 2 show the $^{13}$C NMR spectra of the poly(ethylene-co-p-methystyrene) and the poly (ethylene-co-styrene), both of which contain about 10 mole % of comonomers (i.e. p-methylstyrene and styrene), respectively. In general, fewer chemical shifts shown in the poly(ethylene-co-p-methystyrene) sample imply more homogeneity in the copolymer microstructure. It is logical to expect that the methyl group substitution at the para-position will have very little effect on the chemical shifts of methylene and methine carbons in the polymer backbone. In other words, the comparison of aliphatic chemical shifts is a direct comparison of their sequence distributions between poly(ethylene-co-p-methylstyrene) and poly(ethylene-co-styrene). FIGS. 3 and 4 are the expanded $^3$C NMR spectra in the aliphatic region of the poly(ethylene-co-p-methylstyrene) and the poly(ethylene-co-styrene). For detail analysis, the experimental results were compared with the literature reference, T. Mijatake et. al., Makromol. Chem., Macromol. Symp. 66, 203, 1993, and the theoretical chemical shifts which were calculated based on the improved Grant and Paul empirical method, J. Am. Chem. Soc., 86, 2984, 1964, and J. C. Randall, J. of Polym. Sci., Polym. Phy. Ed., 13, 901, 1975. Table 3 shows the summary of the calculated and observed chemical shifts for methylene and methine carbons in the polymer backbone.

TABLE 3

The comparison of calculated and observed chemical shifts for methylene and methine carbons in poly(ethylene-co-p-methylstyrene) P(E-co-p-MS) and poly(ethylene-co-styrene) P(E-co-S).

| Carbon type* | Sequence** | Calculated (ppm) | Observed P(E-co-p-MS) (ppm) | Observed P(E-co-S) (ppm) |
|---|---|---|---|---|
| $S_{\beta\beta}$ | SES | 25.91 | | 25.22 |
| $S_{\beta\delta}$ | SEE | 28.01 | 27.74 | 27.36 |
| $S_{\delta\delta}$ | EEE | 30.13 | 29.80 | 29.26 |
| $S_{\gamma\delta}$ | EEE | 30.56 | | 29.42 |
| $S_{\alpha\alpha}$ | SSE | 34.75 | | 34.13/34.60 |
| $S_{\alpha\delta}$ | SES | 37.10 | 37.04 | 36.48 |
| $S_{\alpha\gamma}$ | SEE | 37.10 | | 36.65 |
| $T_{\beta\beta}$ | SSS | 41.60 | | |
| $T_{\beta\delta}$ | SSE | 45.53 | | 45.64 |
| $T_{\delta\delta}$ | ESE | 47.60 | 45.77 | 46.08 |

*S: methylene carbon; T: methine carbon; $\alpha, \beta, \gamma, \delta$: distance from methylene or methine carbon to the adjacent aromatic substituted methine carbon. ($\delta$ includes the distance beyond four carbons away)
**E: ethylene; S: styrene or p-methylstyrene In general, the calculated and experimental results are in good agreement. The small deviation in the exact chemical shift most likely is due to the treatment of the phenyl side group which was not substantiated from the alkane group in Grant and Paul empirical method. Every chemical shift in FIG. 3 can be clearly assigned. In addition to the two chemical shifts (21.01 and 29.80 ppm), corresponding to the methylene carbons from ethylene monomer and methyl carbons from p-methylstyrene, respectively, there are three well-resolved peaks (27.74, 37.04 and 45.78 ppm) corresponding to methylene and methine carbons from p-methylstyrene units which are separated by multiple ethylene units along the polymer chain. On the other hand, the spectrum in FIG. 4 shows a much more complicated methylene and methine carbon species in the poly(ethylene-co-styrene) sample with several relatively broad bands. Many consecutive and adjacent styrene units (SSE and SES) clearly exist in the polymer chain, as shown in Table 3. There is no detectable SSS sequence in the copolymer.

EXAMPLE 24

Oxidation Reaction of Poly(ethylene-co-p-methylstyrene)

About 1.0 g of copolymer obtained from Example 3 was added to the glass flask containing 75 ml of phenylchloride and 25 ml of acetic acid mixture together with 0.12 g of cobalt (III) acetate tetrahydrate and 0.21 g of sodium bromide. The suspension mixture was heated to 105° C. and oxygen was bubbled through for 3 hrs. The reaction was then terminated with MeOH, washed with MeOH, water and acetone and dried under vaccum at 50° C. for 24 hrs. About 0.90 g of polymer were obtained. The composition of the polymer was examed by $^1$H NMR and DSC. The $^1$H NMR spectrum showed the presence of —CHO and —COOH groups and the DSC curve of the functionalized polymer showed a sharp peak with a melting point at 126.6° C. (6.6° C. higher than that of ethylene/p-methylstyrene copolymer before oxidation). The functionalized polymer was completely soluble in p-xylene and trichlorobenzene (TCB) at high temperature.

EXAMPLE 25

Chlorination Reaction of Poly(ethylene-co-p-methylstyrene)

About 0.5 g of poly(ethylene-co-p-methylstyrene) obtained from Example 2 was swelled in 20 ml of a chloform/dichlormethane (1/1) mixed solvent. After adding 90 ml of sodium hypochlorite solution (>4.0% Cl available), the pH of the mixture was adjusted to a value in the range of 8.0–9.0 by using concentrated hydrochloric acid. Benzyltriethylammonium chloride (0.196 g) was then added to the mixture. The resulting suspended solution was then stirred vigorously for 23 hrs under $N_2$ atmosphere. The polymer was isolated by filtering, washing succesively with methanol, water, dichloromethane/methanol and then methanol, and dried under vacuum at 50° C. for 24 hrs. About 0.60 g of copolymer were obtained. The copolymer was examined by $^1$H NMR and DSC. The $^1$H NMR spectrum showed the presence of $CH_2Cl$ groups in the copolymer, and the DSC curve of functionalized copolymer showed a sharp peak with the melting point at 117.1° C. (5.5° C. lower than that of copolymer before chlorination). The functionalized copolymer was completely soluble in p-xylene and trichlorobenzene (TCB) at high temperature.

EXAMPLE 26

Chlorination Reaction of Poly(ethylene-co-p-methylstyrene)

About 2 g of poly(ethylene-co-p-methylstyrene), containing 3.13 mole % of p-methylstyrene, were mixed with 50 mg of 2,2'-azibisisobutyronitrile (AIBN) in a 150 ml air-free flask equiped with a refluxing condenser. Anhydrous carbon tetrachloride ($CCl_4$) (70 ml) was added, followed by the addition of 0.75 ml of sulfuryl chloride, which was injected into the flask while stirring under $N_2$ while the flask was kept in the dark. After stirring the reaction mixture at 60° C. for 2 hrs, the reaction was cooled to room temperature. The resulting polymer was precipitated in methanol and was washed repeatly with acetone and methanol. The resulting functionalized copolymer was completely soluble in p-xylene and trichlorobenzene (TCB) at high temperature. $^1$H NMR spectrum, showing chemical shifts at 4.63 and 3.95 ppm, indicated that the copolymer was a chlorinated product.

EXAMPLE 27

Bromination Reaction of Poly(ethylene-co-p-methylstyrene)

About 2 g of poly(ethylene-co-p-methylstyrene), containing 3.13 mol % of p-methylstyrene, were mixed with 0.542 g (3.05 mmol) of N-bromosuccinimide (NBS) and 41.2 mg of benzoyl peroxide (BPO) in a 150 ml air-free flask equiped with a refluxing condenser. After 40 ml of anhydrous $CCl_4$ were injected into the flask, the reaction was heated up 60° C. for 2 hrs under $N_2$ and in the dark. The reaction mixture was then cooled to room temperature, and the resulting polymer was precipiated by adding methanol to the flask. The polymer was isolated by filtration and was washed repeatly with acetone and methanol. The polymer was completely soluble in TCB at high temperature. $^1$H NMR spectrum, showing a chemical shift at 4.54 ppm, indicated a brominated product.

EXAMPLE 28

Bromination Reaction of Poly(propylene-co-p-methylstyrene)

About 1.0 g of poly(propylene-co-p-methylstyrene) obtained from Example 15 was swelled in 100 ml of anhydrous carbon tetrachloride solution. While in the dark, 0.30 g of N-bromosuccinimide and 0.01 g of benzoyl peroxide were added to the mixture. The bromination reaction was carried out at the boiling point of the solvent for 3 hrs under nitrogen atmosphere before being terminated by the addition of methanol. The polymer was isolated by filtering, sucessively washing with methanol, water and acetone, and drying under vacuum at 50° C. for 24 hrs. About 1.05 g brominated copolymer were obtained. From $^1$H NMR studies, all para-$CH_3$ groups were brominated to —$CH_2Br$ groups. This functionalized polymer was completely soluble in TCB at high temperature.

EXAMPLE 29

Lithiation reaction of poly(ethylene-co-p-methylstyrene)

In an argon filled dry box, 10 g of poly(ethylene-co-p-methylstyrene) with 2.76 mol % of p-methylstyrene (9.08 mmol) were suspended in 100 ml of cyclohexane in a 250 ml air-free flask with a magnetic stair bar. While still in the dry box, 21 ml (27.3 mmol) of 1.3M s-BuLi solution and 4.2 ml (27.3 mmol) of TMEDA were added to the flask. The flask was then brought out of the dry box and the contents therof was heated up to 60° C. for 4 hrs under $N_2$. The reaction mixture was then cooled down to room temperature and moved back to the dry box. The resulting polymer was filtered and washed completely with cycohexane until decoloration of the filtrate was observed. The polymer was then dried under vaccum. A lithiated yellow polymer powder was obtained.

EXAMPLE 30

Carboxylation of poly(ethylene-co-4-methylstyrene)

About 1 g of the lithiated polymer obtained from Example 29 was suspended in 20 ml of dry tetrahydrofuran (THF) at room temperature. High purity $CO_2$ gas was bubbled through the slurry for about 1 hr until the color of polymer turned to white. The reaction was then terminated by adding dilute HCl solution in methanol. The resulting polymer was then filtered and washed repeatly with hot water and methanol, and was then dried under vaccum. IR measurement clearly showed —COOH peaks; $^1$H NMR spectrum showed a peak at 3.68 ppm, corresponding to a methylene proton next to phenyl and —COOH groups.

EXAMPLE 31

Lithiation and Silyation of Poly(propylene-co-p-methylstyrene)

In an argon filled dry box, 8 g of poly(propylene-co-p-methylstyrene) containing 0.48 mol % of p-methylstyrene were mixed with 5.6 ml of 1.3M secondary-butyl lithium (sec-BuLi) and 2.2 ml N,N,N',N'-tetramethylethylenediamine (MEDA) in 100 ml cyclohexane. Lithiation took place at 65° C. for 4 hrs. The resulting polymer was filtered and washed repeatly with hexane. About 0.5 g of the lithiated polymer was then suspended in 15 ml THF and 1.0 ml of trimethyl chloro silane ($Me_3SiCl$) was added to the slurry. After reacting for 2 hours at room temperature, the silylated PP was collected by filtering and washing successively with THF, methanol, water and then methanol. The resulting polymer was dried under vaccum. $^1$H NMR spectrum showed a strong peak at 0.05 ppm, corresponding to a methyl proton next to Si. The silylation efficiency was about 70%.

EXAMPLE 32

Silylation of Poly(ethylene-co-p-methylstyrene)

About 1 g of the lithiated polymer obtained from Example 29 was suspended in 20 ml of dry THF and 0.5 g of $Me_3SiCl$ was added and stirred at room temperature for 2 hrs. The resulting polymer was then filtered and washed repeatly with THF, methanol, water and then methanol, and then was dried under vaccum. $^1$H NMR spectrum showed a strong peak at 0.05 ppm, corresponding to a methyl proton next to Si.

EXAMPLE 33

Aldehydation of Poly(ethylene-co-p-methylstyrene)

After 1 g of the lithiated polymer, obtained from Example 29, was suspended in 20 ml of dry THF, 0.5 g of dry dimethyl formamide (DMF) was added and stirred at room temperature for 2 hrs. The resulting polymer was then filtered and washed successively with THF/$H_2O$, THF/$H_2O$/HCl, $H_2O$, THF/$H_2O$, THF and methanol, and was then dried under vaccum. A slightly yellow polymer was obtained. IR spectrum of the polymer showed —CHO absorption.

EXAMPLE 34

Preparation of Poly(ethylene-co-p-3-bromopropylstyrene)

After 1 g of the lithiated polymer, obtained from Example 29, was suspended in 20 ml of dry THF, 0.5 g of 1,2-dibromoethane ($BrCH_2CH_2Br$) was added and stirred at room temperature for 2 hrs. The resulting polymer was filtered and washed successively with THF, ether, THF/$H_2O$, $H_2O$, THF and then methanol, and then was dried under vaccum. IH NMR spectrum showed a strong peak at 4.96 ppm, corresponding to a methylene proton next to Br.

EXAMPLE 35

Hydroxylation of Poly(ethylene-co-p-methylstyrene)

After 1 g of the lithiated polymer, obtained from Example 29, was suspended in 20 ml of dry THF, 3 ml of 1.0M of methoxy-9-borobicyclononane ($CH_3O$-9-BBN) was added and stirred at room temperature for 2 hrs. The resulting polymer was filtered and washed repeatly with THF. The THF slurry containing the polymer was then oxidized by adding NaOH/$H_2O_2$ at 40° C. for 4 hrs. The hydroxylated polymer was collected by filtering. The polymer was then washed successively with methanol, $H_2O$/HCl, water and then methanol, and then was dried under vaccum. $^1$H NMR spectrum showed a strong peak at 4.65 ppm, corresponding to a methylene proton next to phenyl and hydroxy groups.

EXAMPLE 36

Preparation of Poly(ethylene-co-p-2-hydroxyethylstyrene)

After 1 g of the lithiated polymer, obtained from Example 29, was suspended in 20 ml of dry THF at room temperature, ethylene oxide gas was bubbled through the slurry for about 2 hr. Decoloration of the sample indicated that the reaction was essentially complete. The reaction was then terminated by adding dilute HCl solution in methanol. The resulting polymer was filtered and washed succesively with methanol, hot water and then methanol, and then was dried under vaccum. The functionalized polymer product was completely soluble in TCB at high temperature. $^1$H NMR spectrum showed two peaks at 4.04 and 2.73 ppm, corresponding to two methylene units between phenyl and hydroxy groups.

EXAMPLE 37

Amination of Poly(ethylene-co-4-methylstyrene)

About 1.0 g of brominated polymer, obtained from Example 27, was suspended in 20 ml of toluene with 0.5 g of tetrabutylamminium bromide and 0.2 g of potassium phthalimide. The slurry solution was stirred under $N_2$ and was heated to 100° C. for 3 hrs. The reaction mixture was then cooled to room temperature and the resulting polymer was filtered and washed successively with toluene, THF and then ethanol (EtOH) repeatly before being re-suspending in ethanol solution. To this slurry solution, 2 ml of $N_2H_4$ were added and stirred at room temperature for 2 hrs. A white polymer powder was recovered by filtration, washing with EtOH and then vacuum drying.

EXAMPLE 38

Amidation of Poly(ethylene-co-p-methylstyrene)

After 1 g of the lithiated polymer, obtained from Example 29, was suspended in 20 ml of dry benzene, 2 ml of phenylisocyanate were added and the mixture was stirred at room temperature for 1 hr. The mixture was then heated up to 60° C. and stirred for 1 hour. The resulting polymer was then filtered and washed successively with EtOH, THF, THF/$H_2O$, $H_2O$, THF/$H_2O$, THF and then methanol, and was then dried under vacuum. The resulting polymer was examined by IR and $^1$H NMR measurements. IR absorption peaks were observed at 1665, 1599, 1545 cm$^{-1}$ and chemical shifts were observed at 3.71, 7.40 ppm, both indicating an amidated poly(ethylene-co-p-methylstyrene) structure.

EXAMPLE 39

Phosphination of Poly(ethylene-co-p-methylstyrene)

After 1 g of the lithiated polymer, obtained from Example 29, was suspended in 20 ml of dry THF, 1 g chlorodiphenylphosphine was added and stirred at room temperature for 2 hrs. The resulting polymer was then filtered and washed successively with THF, THF/H20, $H_2O$, THF/$H_2O$, THF and then methanol, and was then dried under vacuum. $^1$H NMR spectrum, showing chemical shifts at 3.61, 3.64, 7.45 and 7.70 ppm, indicated a phosphinated polymer.

EXAMPLE 40

Thiolation of Poly(ethylene-co-p-methylstyrene)

After 1 g of the lithiated polymer, obtained from Example 29, was suspended in 20 ml of dry THF, 0.5 g of sulfur was added and stirred at room temperature for 2 hrs. About 20 ml of 3N HCl were added and stirred for another 30 minutes. The resulting polymer was then filtered and washed successively with THF, $CCl_4$, EtOH, $H_2O$, THF/$H_2O$, THF and then methanol, and was then dried under vacuum. A slightly yellow polymer was obtained.

EXAMPLES 41–52

PE Graft Copolymers Prepared by Graft-from Reactions

About 10 g of poly(ethylene-co-p-methylstyrene), containing 2.44 mol % of p-methylstyrene, were lithiated by the procedure described in Example 29. The lithiated polyethylene copolymer was then suspended in hexane or THF solvent. Graft-from reactions were then carried out in slurry solution by reacting the lithiated polyethylene copolymer with an anionic polymerizable monomer, such as styrene, methylmethacrylate, vinyl acetate, acrylonitrile or p-methylstyrene. After the reaction time indicated in Table 4, 10 ml of isopropanol were added to terminate the graft-from reaction. The precipitated polymer was filtered and then subjected to fractionation. Good solvents for backbone and side chain polymers were used during the fractionization, using a Soxhlet apparatus under $N_2$ for 24 hours. The soluble fractions were isolated by vacuum-removal of solvent. Usually, the total soluble fractions were less than 5% of the product. The major insoluble fraction was PE graft copolymer, which was completely soluble in xylene or trichlorobenzene at elevated temperatures. The graft copolymer structures and compositions were determined by IR, $^1$H NMR, GPC and DSC studies. Table 4 summarizes the reaction conditions and the experimental results.

TABLE 4

A summary of the anionic graft-from polymerization reactions by using lithiated poly(ethylene-co-p-methylstyrene) as initiator

| Example | lithiated polymer g | comonomer g | solvent | Temp. °C. | time hr. | graft copolymer g | comonomer in graft copolymer mole % |
|---|---|---|---|---|---|---|---|
| 41 | 1.5 | ST/1.9 | hexane | r.t. | 1 | 3.3 | 24.4 |
| 42 | 1.2 | ST/2.9 | hexane | r.t | I | 3.8 | 36.8 |
| 43 | 1.2 | ST/5.9 | hexane | r.t | I | 6.8 | 54.7 |
| 44 | 1.0 | MMA/3.7 | THF | 0 | 1.5 | 1.86 | 20.0 |
| 45 | 1.0 | MMA/3A | THF | 0 | 15 | 2.66 | 31.8 |
| 46 | 0.5 | MMA/2.5 | THF | r.t. | 5 | 0.95 | 20.1 |
| 47 | 0.8 | MMA/4.0 | hexane | r.t. | 5 | 3.08 | 44.4 |
| 48 | 0.8 | MMA/4.0 | hexane | 0 | 5 | 2.21 | 33.0 |
| 49 | 1.2 | AN/3.0 | THF | r.t. | 1 | 1.60 | 15.0 |
| 50 | 0.55 | AN/1.75 | THF | r.t. | 16 | 1.04 | 32.0 |
| 51 | 1.0 | AN/3.0 | hexane | r.t. | 16 | 2.99 | 51.2 |
| 52 | 1.0 | p-ms/4.0 | hexane | r.t. | 0.5 | 5.0 | 48.7 |

ST: styrene, MMA: methyl methacrylate, AN: acrylonitrile, p-ms: p-methylstyrene

EXAMPLES 53–55

Synthesis of PE-g-PCL Graft Copolymers

About 10 g of poly(ethylene-co-p-methylstyrene), containing 2.44 mol % of p-methylstyrene), were lithiated by the procedure described in Example 29. The lithiated polymer was suspended in 100 ml of THF and ethylene oxide was bubbled through the slurry until decoloration was observed. The resulting polymer was filtered and washed with THF and dried. This polymer was further reacted with 10 ml 1.8M of diethylaluminum chloride (AlEt$_2$Cl) in 100 ml of toluene at room temperature for 4 hrs to form a PF-OAlEt$_2$ solid, which was filtered and washed completely with toluene and hexane, and then dried. The product was used as a polymer substrate for graft-from polymerization. The cyclic ester ε-caprolactone (E-CL, Aldrich Chemical) was purified by drying over calcium hydride and distilling tinder reduced pressure. In the dry box, caprolactone was added to a slurry of PE-OAlEt$_2$ in 20 ml of toluene. The reaction mixture was stirred at room temperature for the indicated reaction time, at which time the reaction was terminated by the addition of MeOH. The resulting polymer was isolated by precipitating into acidified MeOH. The polymer mass was extracted with hot acetone in a Soxhelet apparatus under $N_2$ for 48 hours to remove any $\epsilon$-CL homopolymer, which is soluble in acetone. The insoluble polymer was PE-g-PCL, which was completely soluble in xylene at elevated temperatures. The polymer structure and composition for each example were confirmed by IR, $^1$H NMR, GPC and DSC studies. Table 5 summarizes the reaction conditions and results.

TABLE 5

A summary of the preparation of PE-g-PCL graft copolymers

| example | PE-OAlEt$_2$ g | e-CL g | reaction time hr. | PE-g-PCL g | caprolactone in graft copolymer mole % |
|---|---|---|---|---|---|
| 53 | 1.0 | 6.0 | 3.0 | 1.2 | 5.7 |
| 54 | 1.0 | 3.0 | 17 | 2.8 | 35.6 |
| 55 | 1.0 | 6.0 | 17 | 5.1 | 55.0 |

*toluene as solvent, room temperature

EXAMPLES 56–66

PP Graft Copolymers Prepared by Graft-from Reactions

The lithiated PP obtained from Example 31 was used in a graft-from polymerization with styrene, methylmethacrylate (MMA), acrylonitrile (AN) and p-methylstyrene, respectively. The anionic graft-from reaction procedure used in Examples 41–52 was carried out on the lithiated polypropylene. The resulting graft copolymer structures and compositions were determined by IR, $^1$H NMR, GPC and DSC studies. The reaction conditions and results for the individual examples are summarized in Table 6.

TABLE 6

A summary of the anionic graft-from polymerization reactions** by using lithiated poly(propylene-co-p-methylstyrene) as initiator

| example | lithiated PP g | comonomer* g | time hrs | graft copolymer g | comonomer in graft mol % |
|---|---|---|---|---|---|
| 56 | 1.5 | ST/2.3 | 1.0 | 2.5 | 21.9 |
| 57 | 1.2 | ST/4.5 | 1.0 | 3.5 | 35.3 |
| 58 | 1.0 | ST/3.0 | 2.3 | 3.9 | 43.0 |
| 59 | 1.0 | MMA/4.0 | 16 | 1.7 | 23.0 |
| 60 | 0.7 | MMA/5.4 | 18 | 2.2 | 38.5 |
| 61 | 1.0 | AN/3.0 | 18 | 2.3 | 50.0 |
| 62 | 1.0 | pms/3.05 | 0.5 | 1.4 | 12.2 |
| 63 | 1.0 | pms/3.05 | 1.0 | 1.7 | 20.6 |
| 64 | 1.0 | pms/3.05 | 2.0 | 2.8 | 39.0 |
| 65 | 1.0 | pms/3.05 | 4.0 | 4.0 | 51.8 |
| 66 | 2.0 | pms/4.10 | 4.0 | 6.1 | 41.9 |

*ST: styrene, MMA: methyl methacrylate, AN: acrylonitrile, p-ms: p-methylstyrene
**cyclohexane as solvent, room temperature.

EXAMPLES 67–73

Synthesis of PP-g-polybutadiene Graft Copolymers

Poly(propylene-co-p-methylstyrene), containing 0.78 mol % of p-methylstyrene, was lithiated by the same procedure described in Example 31. The lithiated PP polymer was then suspended in hexane or THF solvent along with the indicated quantity of 1,2-dipiperidinoethane. Graft-from reactions were carried out in slurry solution by reacting the lithiated polymer with butadiene at room temperature. After the indicated reaction time, 10 ml of isopropanol was added to terminate the graft-from reaction. The precipitated polymer was filtered and then subjected to fractionation. Hexane was used to remove polybutadiene homopolymer. The major insoluble fraction was PP-g-polybutadiene graft copolymer, which was completely soluble in trichlorobenzene at elevated temperatures. The graft copolymer structures and compositions were determined by IR, $^1$H NMR, GPC and DSC studies. Table 7 summarizes the reaction conditions and the experimental results.

TABLE 7

A summary of the preparation of PP-g-polybutadiene graft copolymers

| Example | lithiated PP g | *DPDE/Li mol/mol | solvent | BD** ml | graft copolymer g | BD in graft mole % | structure of PBD** 1,2- mole % | 1,4- mole % |
|---|---|---|---|---|---|---|---|---|
| 67 | 1.0 | 0 | hexane | 7 | 5.0 | 75.8 | 79.4 | 20.6 |
| 68 | 1.0 | 5 | hexane | 4 | 3.2 | 63.1 | 87.2 | 12.8 |
| 69 | 1.0 | 10 | hexane | 8 | 5.9 | 79.1 | 91.9 | 8.1 |
| 70 | 3.1 | 10 | hexane | 8 | 8.1 | 55.4 | 90.2 | 9.8 |
| 71 | 1.0 | 10 | THF | 6 | 1.1 | — | — | |
| 72 | 1.2 | 0 | hexane | 5 | 4.0 | 64.4 | 82.0 | 18.0 |
| 73 | 2.2 | 10 | hexane | 7 | 4.7 | 46.9 | 98.3 | 1.7 |

*External base: 1,2-dipiperidinoethane
**BD: butadiene, PBD: polybutadiene

What is claimed is:

1. A functionalized copolymer of α-olefin having from 2 to 12 carbon atoms and para-alkylstyrene, said functionalized copolymer having a substantially homogeneous compositional distribution represented by the formula:

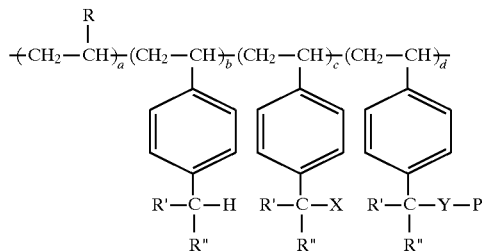

in which R is hydrogen or a $C_1$ to $C_{10}$ linear or branched alkyl group; and R' and R" are, independently, hydrogen or $C_1$ to $C_5$ primary or secondary alkyl groups; X is a functional group; P is a polymer having a molecular weight of at least 500; Y is a chemical linkage between said polymer P and a para-alkylstyrene side chain; a is a number ranging from about 50 to 100,000; b, c and d, independently, range from 0 to about 10,000; the sum of c +d is at least 1; and the combination of a +b +c+d represents the empirical formula of a substantially random functional polymer; and wherein said functionalized copolymer has been derived from an initial copolymer comprising units derived from α-olefin and units derived from para-alkylstyrene; said initial copolymer having a substantially homogeneous compositional distribution and having been prepared in the presence of a metallocene catalyst; said initial copolymer being represented by the formula:

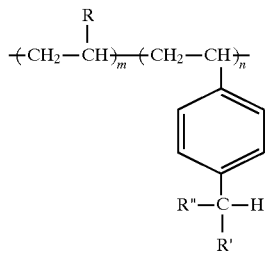 (I)

wherein R, R' and R" are defined as above; wherein the α-olefin mole % (m) is between about 5 and 99.9; wherein the sum of m and n (mole % para-alkylstyrene) is 100; and wherein the initial copolymer has a number average molecular weight (Mn) of at least 1,000 and a ratio of weight average molecular weight (Mw) to number average molecular weight of less than 8.

2. The functionalized copolymer of claim 1, where R is hydrogen or $C_1$ to $C_3$ linear or branched alkyl; R' and R", independently, are hydrogen or $C_1$ to $C_5$ linear or branched alkyl; X is selected from the group consisting of —COOH, —OH, —SH, —NH$_2$, —Cl, —Br, —M (where M=a metal ion), —COOM and anhydrides; and Y is a simple chemical bond or the residue of a functional group.

3. The functionalized copolymer of claim 2, where R' and R" are hydrogen; and Y is a simple chemical bond or a functional group selected from the group consisting of ether, ester, amide and imide groups.

4. The functional copolymer of claim 2, wherein (d) is 0 and (c) is at least 1.

5. The functional copolymer of claim 2, wherein (c) is 0 and (d) is at least 1.

6. The functional copolymer of claim 3, wherein (d) is 0 and (c) is at least 1.

7. The functional copolymer of claim 3, wherein (c) is 0 and (d) is at least 1

8. The functionalized copolymer of claim 1, wherein the units derived from α-olefin are derived from α-olefin selected from the group consisting of polyethylene, polypropylene, poly(1-butene), poly(1-octene) and mixtures thereof.

9. The functionalized copolymer of claim 8, wherein the initial copolymer comprises units derived from polypropylene.

10. The functionalized copolymer of claim 9, wherein the polypropylene segments comprise isotactic, syndiotactic and atactic microstructures.

11. The functionalized copolymer of claim 2, wherein X is selected from chlorine and bromine.

12. The functionalized copolymer of claim 3, wherein X is selected from chlorine and bromine.

13. The functionalized copolymer of claim 2, wherein X is selected from hydroxy and amino groups.

14. The functionalized copolymer of claim 3, wherein X is selected from hydroxy and amino groups.

15. The functionalized copolymer of claim 2, wherein X is selected from carboxylic acid, carboxylic acid anhydride, and metal salts of carboxylic acid.

16. The functionalized copolymer of claim 3, wherein X is selected from carboxylic acid, carboxylic acid anhydride, and metal salts of carboxylic acid.

17. The functionalized copolymer of claim 1, wherein Y is a residue derived from a graft reaction and is a single chemical bond between the copolymer of α-olefin and p-methylstyrene and the side chain polymer P; and wherein P is selected from the group consisting of polymers and copolymers of the anionically polymerizable monomers.

18. The functionalized copolymer of claim 2, wherein Y is a residue derived from a graft reaction and is a single chemical bond between the copolymer of α-olefin and p-methylstyrene and the side chain polymer P; and wherein P is selected from the group consisting of polymers and copolymers of the anionically polymerizable monomers.

19. The functionalized copolymer of claim 3, wherein Y is a residue derived from a graft reaction and is a single chemical bond between the copolymer of α-olefin and p-methylstyrene and the side chain polymer P; and wherein P is selected from the group consisting of polymers and copolymers of the anionically polymerizable monomers.

20. The functionalized copolymer of claim 17, wherein said anionically polymerizable monomers are selected from the group consisting of vinyl aromatic compounds, butadiene, isoprene, alkyl acrylates, alkyl methacrylates, vinyl unsaturated amides, methacrylonitrile, acrylonitrile, vinyl pyridines, and mixtures thereof.

21. The functionalized copolymer of claim 1, wherein Y is selected from the group consisting of —O—and —S—; and wherein P is selected from the group consisting of polymers and copolymers of the free radically polymerizable monomers.

22. The functionalized copolymer of claim 21, wherein said free radically polymerizable monomers are selected from the group consisting of ethylene, vinyl aromatic compounds, acrylates, methacrylates, vinyl acetate, acrylamides, methacrylamides, acrylonitrile, methacrylonitrile and mixtures thereof.

23. The functionalized copolymer of claim 1, wherein Y is a linked nucleophilic residue and P is selected from the group consisting of polymers and copolymers of the anionically polymerizable monomers, anionically and cationically ring-openable monomers and oxidatively coupleable monomers.

24. The functionalized copolymer of claim 23, wherein said anionically and cationically ring-openable monomers are selected from the group consisting of cyclic ethers, sulfides, lactones, lactams and n-carboxyanhydrides
25. The functionalized copolymer of claim 1, wherein Y is selected from the group consisting of
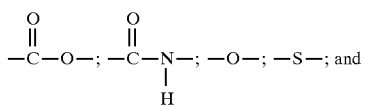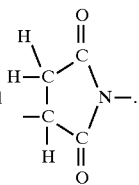
* * * * *